United States Patent
You et al.

(10) Patent No.: US 11,558,903 B2
(45) Date of Patent: Jan. 17, 2023

(54) INITIAL ACCESS METHOD OF IAB NODE IN WIRELESS COMMUNICATION SYSTEM AND APPARATUS USING SAME METHOD

(71) Applicant: LG ELECTRONICS INC., Seoul (KR)

(72) Inventors: Hyangsun You, Seoul (KR); Huayue Song, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 87 days.

(21) Appl. No.: 17/052,790

(22) PCT Filed: May 3, 2019

(86) PCT No.: PCT/KR2019/005349
§ 371 (c)(1),
(2) Date: Nov. 3, 2020

(87) PCT Pub. No.: WO2019/212297
PCT Pub. Date: Nov. 7, 2019

(65) Prior Publication Data
US 2021/0251011 A1 Aug. 12, 2021

(30) Foreign Application Priority Data
May 4, 2018 (KR) .................. 10-2018-0051774

(51) Int. Cl.
*H04W 74/08* (2009.01)
*H04W 16/26* (2009.01)
*H04W 48/08* (2009.01)

(52) U.S. Cl.
CPC ....... *H04W 74/0833* (2013.01); *H04W 16/26* (2013.01); *H04W 48/08* (2013.01)

(58) Field of Classification Search
None
See application file for complete search history.

(56) References Cited

U.S. PATENT DOCUMENTS 10,601,477 B2 * 3/2020 Abedini ............ H04W 74/0833
2018/0092139 A1 * 3/2018 Novlan .................. H04W 76/12
(Continued)

OTHER PUBLICATIONS

PCT International Application No. PCT/KR2019/005349, International Search Report dated Aug. 8, 2019, 2 pages.
(Continued)

*Primary Examiner* — Faiyazkhan Ghafoerkhan
(74) *Attorney, Agent, or Firm* — Lee Hong Degerman Kang Waimey

(57) ABSTRACT

An initial access method of an integrated access and backhaul (IAB) node in a wireless communication system and an apparatus using the method are provided. The method includes: receiving, from a parent node, a synchronization signal block (SSB) and system information; and performing a random access procedure with the parent node on the basis of the SSB and the system information, wherein the SSB and the system information are received through a resource allocated to an access link of the parent node, and the random access step is performed through a resource allocated to the backhaul link of the parent node, and the random access step is performed using resources determined differently depending on whether the TAB node is a relay node or a terminal.

13 Claims, 33 Drawing Sheets

(56) References Cited

U.S. PATENT DOCUMENTS

2019/0312619 A1* 10/2019 Abedini ............... H04B 17/382
2021/0251011 A1*  8/2021 You ...................... H04W 16/26

OTHER PUBLICATIONS

Ericsson, "Physical-layer aspects related to IAB," 3GPP TSG-RAN WG1 Meeting #92bis, R1-1805085, Sanya, China, Apr. 16-20, 2018, 7 pages.
LG Electronics, "Discussions on NR IAB support," 3GPP TSG RAN WG1 Meeting #92bis, R1-1804583, Sanya, China, Apr. 16-20, 2018, 11 pages.
Huawei et al., "Consideration on IAB physical layer enhancement," 3GPP TSG RAN WG1 Meeting #91, R1-1720606, Reno, USA, Nov. 27-Dec. 1, 2017, 9 pages.
PCT International Application No. PCT/KR2019/005349, International Search Report dated Aug. 8, 2019, 4 pages.
Oppo, "Discussion of resource allocation for IAB," 3GPP TSG RAN WG1 Meeting #92bis, R1-1803990, Sanya, China, Apr. 16-20, 2018, 4 pages.

* cited by examiner

INITIAL ACCESS METHOD OF IAB NODE IN WIRELESS COMMUNICATION SYSTEM AND APPARATUS USING SAME METHOD

CROSS-REFERENCE TO RELATED APPLICATIONS

This application is the National Stage filing under 35 U.S.C. 371 of International Application No. PCT/KR2019/005349, filed on May 3, 2019, which claims the benefit of earlier filing date and right of priority to Korean Application No. 10-2018-0051774, filed on May 4, 2018, the contents of which are all hereby incorporated by reference herein in their entirety.

BACKGROUND OF THE DISCLOSURE

Field of the Disclosure

The present disclosure relates to wireless communication, and more particularly, to an initial access method of an integrated access and backhaul (IAB) node in a wireless communication system, and an apparatus using the method.

Related Art

With a growing demand on higher communication capacity in many communication devices, there is a need for mobile broadband communication which is more improved than the conventional radio access technology. Further, massive machine type communications (MTC) for providing various services anytime anywhere by connecting a plurality of devices and things is also one of important issues to be considered in next-generation communication. In addition, a communication system design is under discussion by considering a service/terminal which is sensitive to reliability and latency. As such, there is an ongoing discussion on the introduction of a next-generation radio access technology considering enhanced mobile broadband communication (eMBB), massive MTC (mMTC), ultra-reliable and low latency communication (URLLC), or the like. In the present disclosure, this technology is called a new RAT or NR for convenience of explanation. The NR may also be referred to as a fifth generation (5G) system.

Meanwhile, in the NR, due to the necessity of higher data rates and capacity, it is considered to introduce an integrated access and backhaul (IAB). In the IAB, the NR is used for not only an access link but also a backhaul link. For example, a small base station capable of providing a service to a UE via the access link may be connected with a macro base station via a radio backhaul link.

The present disclosure proposes a method in which a node performs initial access in an IAB environment.

SUMMARY OF THE DISCLOSURE

The present disclosure provides an initial access method of an integrated access and backhaul (IAB) node in a wireless communication system, and an apparatus using the method.

In one aspect, provided is an initial access method of an integrated access and backhaul (IAB) node in a wireless communication system. The method includes receiving, from a parent node, a synchronization signal block (SSB) and system information and performing a random access process with the parent node on the basis of the SSB and the system information. The SSB and the system information are received through a resource allocated to an access link of the parent node, and the random access process is performed through a resource allocated to a backhaul link of the parent node. The random access process is performed using resources determined differently depending on whether the IAB node is a relay node or a terminal.

The access link may be a communication link between the parent node and a terminal served by the parent node.

The backhaul link may be a communication link between the parent node and the IAB node.

A resource for transmitting a random access preamble by the IAB node may be determined differently according to whether the IAB node is the terminal or the relay node.

A resource for transmitting a message 3 of the random access process may be determined differently according to whether the IAB node is the terminal or the relay node.

The random access process may comprise transmitting by the IAB node a random access preamble to the parent node, receiving a random access response from the parent node, performing transmission scheduled to the parent node, and receiving a contention resolution message from the parent node. The message 3 may be associated with the scheduled transmission.

When the IAB node transmits the message 3 in the random access process, different scrambling sequence identities (IDs) may be used in the message 3 according to whether the IAB node is the relay node or the terminal.

When the IAB node transmits the message 3 in the random access process, an indication field indicating whether the IAB node is the relay node or the terminal may be included in the message 3.

In another aspect, provided is an integrated access and backhaul (IAB) node. The IAB node includes a transceiver and a processor operatively coupled to the transceiver. The processor is configured to receive, from a parent node, a synchronization signal block (SSB) and system information, and perform a random access process with the parent node on the basis of the SSB and the system information. The SSB and the system information are received through a resource allocated to an access link of the parent node, and the random access process is performed through a resource allocated to a backhaul link of the parent node. The random access process is performed using resources determined differently depending on whether the IAB node is a relay node or a terminal.

A resource for transmitting a random access preamble by the IAB node may be determined differently according to whether the IAB node is the terminal or the relay node.

A resource for transmitting a message 3 of the random access process may be determined differently according to whether the IAB node is the terminal or the relay node.

The random access process may comprise transmitting by the IAB node a random access preamble to the parent node, receiving a random access response from the parent node, performing transmission scheduled to the parent node, and receiving a contention resolution message from the parent node. The message 3 may be associated with the scheduled transmission.

When the IAB node transmits the message 3 in the random access process, different scrambling sequence identities (IDs) may be used in the message 3 according to whether the IAB node is the relay node or the terminal.

When the IAB node transmits the message 3 in the random access process, an indication field indicating whether the IAB node is the relay node or the terminal may be included in the message 3.

The IAB node may communicate with at least one of a mobile terminal, a network, and a self-driving vehicle other than the IAB node.

In still another aspect, provided is a processor for a wireless communication device. The processor is configured to control the wireless communication device to receive, from a parent node, a synchronization signal block (SSB) and system information, and perform a random access process with the parent node on the basis of the SSB and the system information. The SSB and the system information are received through a resource allocated to an access link of the parent node, and the random access process is performed through a resource allocated to a backhaul link of the parent node. The random access process is performed using resources determined differently depending on whether the IAB node is a relay node or a terminal.

According to the present disclosure, if an IAB node performs initial access to a base station or a different relay node, a random access process is performed by using different resources to identify a device type of the IAB node, for example, whether the IAB node is a relay node or a terminal. Therefore, the base station or the different relay node may identify a type of a device which intends to perform initial access thereto, thereby advantageously providing a proper service.

DESCRIPTION OF EXEMPLARY EMBODIMENTS

Figure 1:
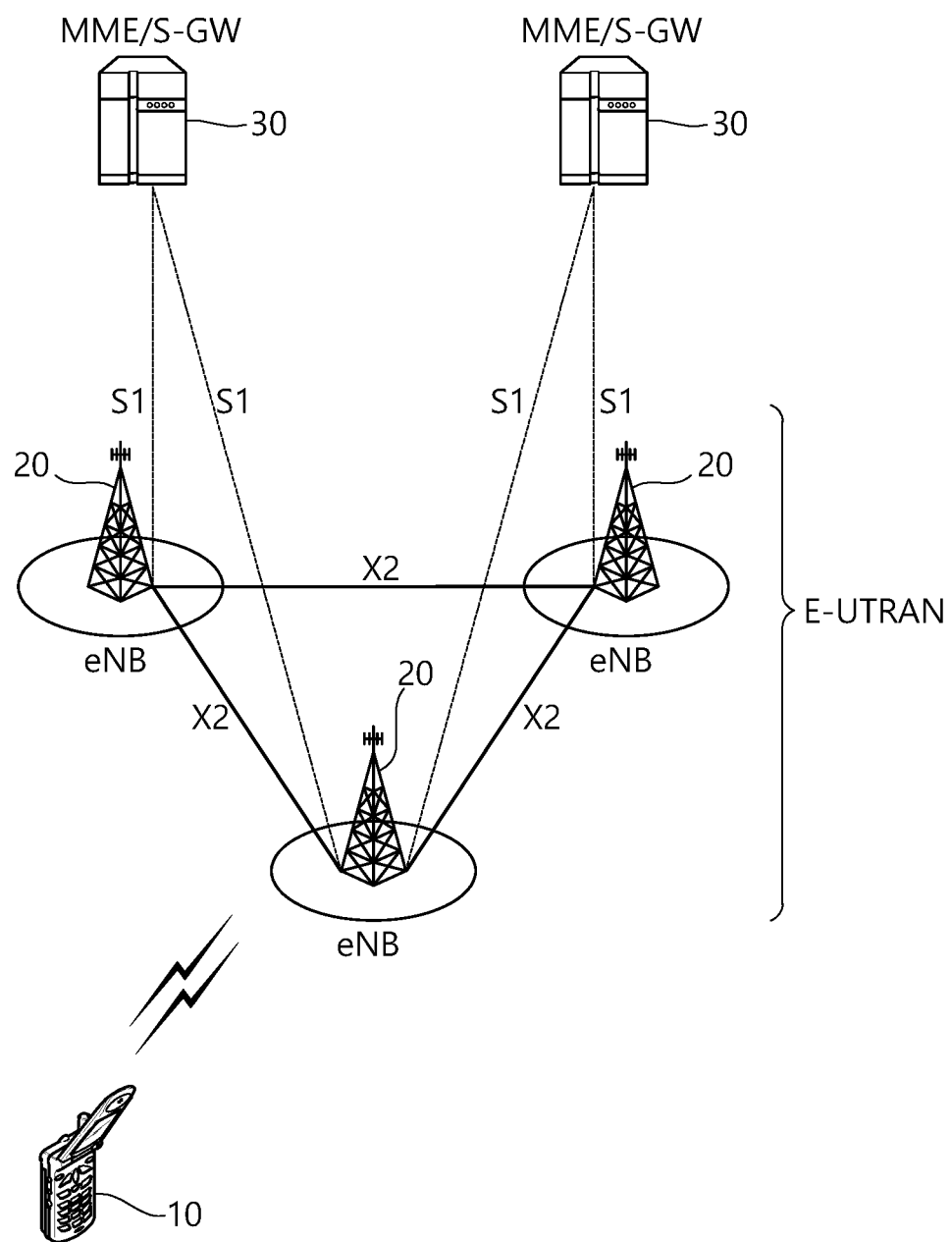
FIG. 1 shows a wireless communication system.

FIG. 1 shows a wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
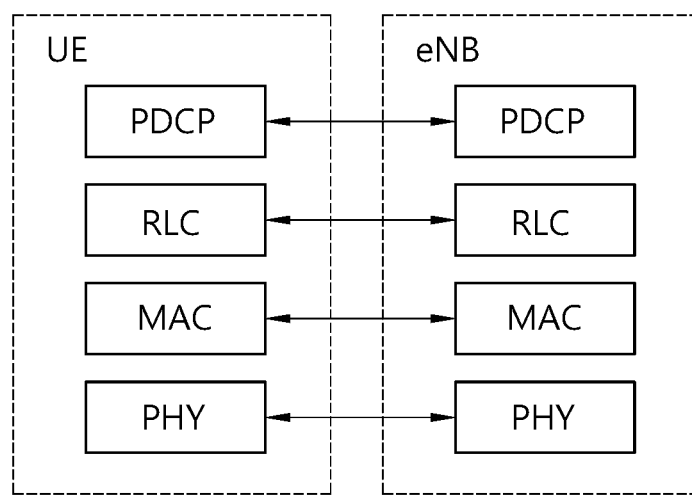
FIG. 2 is a diagram showing a radio protocol architecture for a user plane.
Figure 3:
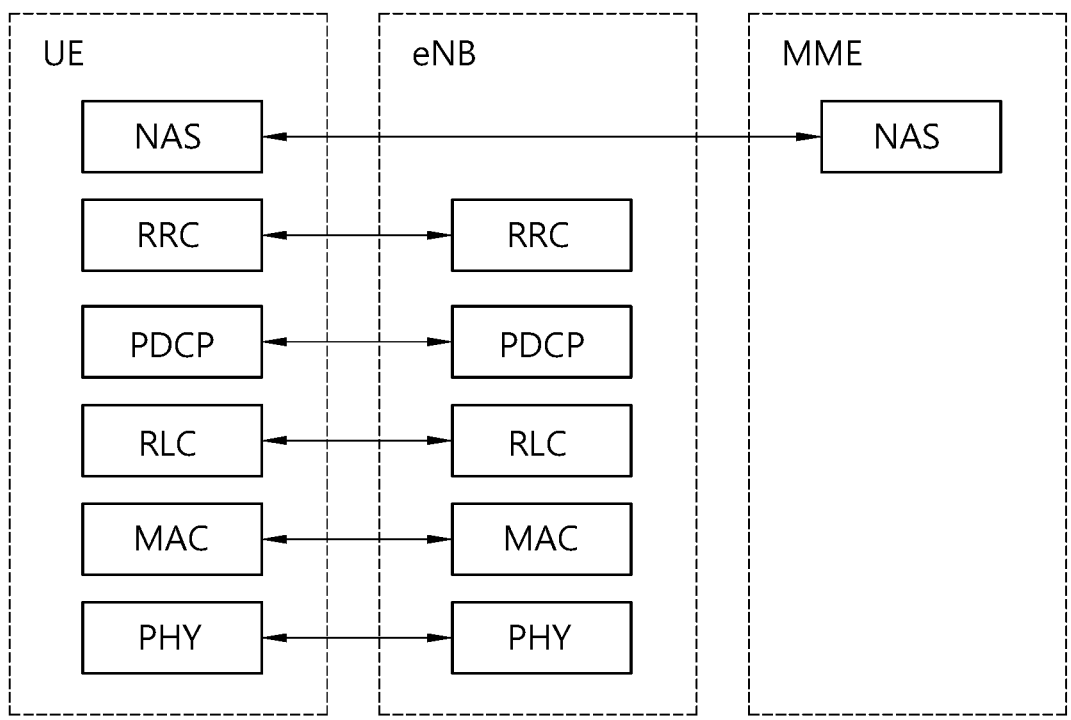
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Figure 4:
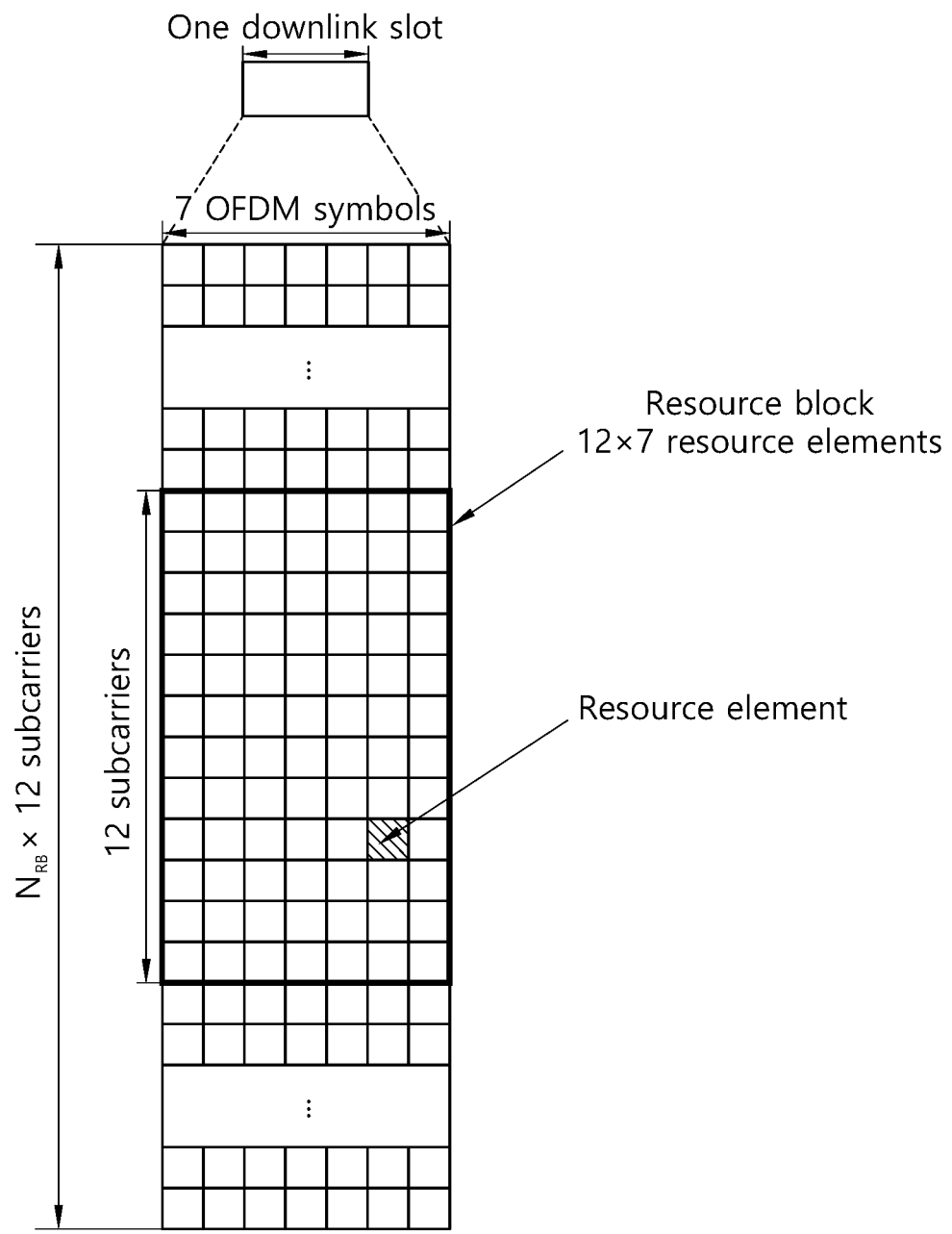
FIG. 4 shows an example of a downlink (DL)/uplink (UL) slot structure in a wireless communication system.

FIG. 4 shows an example of a downlink (DL)/uplink (UL) slot structure in a wireless communication system. In particular, FIG. 4 shows a structure of a resource grid of a 3GPP LTE(-A) system.

The slot may include a plurality of orthogonal frequency division multiplexing (OFDM) symbols in a time domain, and may include a plurality of resource blocks (RBs) in a frequency domain. The OFDM symbol may also imply one symbol duration. Referring to FIG. 4, a signal transmitted in each slot may be expressed by a resource grid consisting of $N^{DL/UL}_{RB} * N^{RB}_{SC}$ subcarriers and $N^{DL/UL}_{symb}$ OFDM symbols. Herein, $N^{DL}_{RB}$ denotes the number of RBs in a DL slot, and $N^{UL}_{RB}$ denotes the number of RBs in a UL slot. $N^{DL}_{RB}$ and $N^{UL}_{RB}$ are respectively dependent on a DL transmission bandwidth and a UL transmission bandwidth. $N^{DL}_{symb}$ denotes the number of OFDM symbols in a DL slot, and $N^{UL}_{symb}$ denotes the number of OFDM symbols in a UL slot. $N^{RB}_{SC}$ denotes the number of subcarriers constituting one RB.

The OFDM symbol may be called an OFDM symbol, a single carrier frequency division multiplexing (SC-FDM) symbol, or the like according to a multiple access scheme. The number of OFDM symbols included in one slot may change variously according to a channel bandwidth and a length of cyclic prefix (CP). For example, one slot may include 7 OFDM symbols in a normal CP case, whereas one slot may include 6 OFDM symbols in an extended CP case. Although a subframe in which one slot consists of 7 OFDM symbols is described as an example in FIG. 4 for convenience of explanation, embodiments of the present disclosure may also similarly apply to subframes each having the different number of OFDM symbols.

One resource block (RB) is defined as $N^{DL/U}_{symb}$ (e.g., 7) consecutive OFDM symbols in a time domain, and is defined by $N^{RB}_{sc}$ (e.g., 12) consecutive subcarriers in a frequency domain. By reference, a resource consisting of one OFDM symbol and one subcarrier is called a resource element (RE) or a tone. Therefore, one RB consists of $N^{DL/UL}_{symb} * N^{RB}_{sc}$ REs. Each RE in a resource grid may be uniquely defined by an index pair (k, 1) within one slot. k is an index assigned from 0 to $N^{DL/UL}_{RB} * N^{RB}_{sc} - 1$ in the frequency domain, and 1 is an index assigned from 0 to $N^{DL/UL}_{symb} - 1$ in the time domain.

Figure 5:
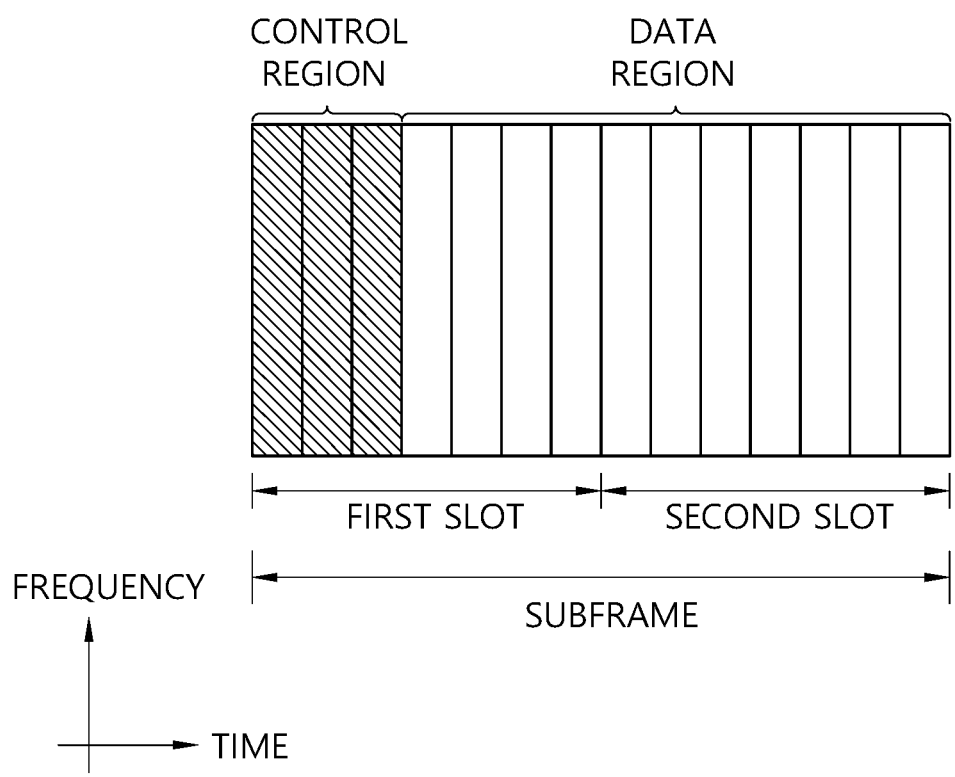
FIG. 5 exemplifies a DL subframe structure used in a 3GPP LTE(-A) system.

FIG. 5 exemplifies a DL subframe structure used in a 3GPP LTE(-A) system.

In a time domain, a DL subframe is divided into a control region and a data region. Referring to FIG. 5, up to 3 (or 4) OFDM symbols located at a front part in a first slot of the subframe corresponds to a control region to which a control channel is allocated. Hereinafter, a resource region that can be used in physical downlink control channel (PDCCH) transmission in the DL subframe is called a PDCCH region. The remaining OFDM symbols other than OFDM symbol(s) used in the control region correspond to a data region to which a physical downlink shared channel (PDSCH) is allocated. Hereinafter, a resource region that can be used in PDSCH transmission in the DL subframe is called a PDSCH region. An example of a DL control channel used in 3GPP LTE includes a physical control format indicator channel (PCFICH), a PDCCH, a physical hybrid ARQ indicator channel (PHICH), or the like. The PCFICH is transmitted in a first OFDM symbol of the subframe, and carries information regarding the number of OFDM symbols used in transmission of the control channel in the subframe. The PHICH carries an HARQ acknowledgment (ACK)/negative-acknowledgment (NACK) signal in response to UL transmission.

Control information transmitted via the PDCCH is referred to as downlink control information (DCI). The DCI includes resource allocation information for a UE or UE group or different control information. For example, the DCI includes a downlink shared channel (DL-SCH)'s transmission format and resource allocation information, uplink shared channel (UL-SCH)'s transmission format and resource allocation information, paging information on a paging channel (PCH), system information on a DL-SCH, resource allocation information of a higher-layer control message such as a random access response transmitted on a PDSCH, a transmission (Tx) power control command set for individual UEs included in the UE group, activation indication information of voice over Internet (VoIP), etc. DCI carried by one PDCCH has a different size and usage according to a DCI format, and a size thereof may vary depending on a coding rate.

A plurality of PDCCHs may be transmitted within a PDCCH region of the DL subframe. The UE may monitor the plurality of PDCCHs. An eNB determines a DCI format according to downlink control information (DCI) to be transmitted to the UE, and attaches a cyclic redundancy check (CRC) to the DCI. The CRC is masked (or scrambled) with an identifier (e.g., a radio network temporary identifier (RNTI)) according to an owner or a usage purpose of the PDCCH. For example, if the PDCCH is for a specific UE, an identifier (e.g., cell-RNTI (C-RNTI)) of the UE may be masked to the CRC. If the PDCCH is for a paging message, a paging identifier (e.g., paging-RNTI (P-RNTI)) may be masked to the CRC. If the PDCCH is for a system information (more specifically, system information block (SIB)), a system information RNTI (SI-RNTI) may be masked to the CRC. If the PDCCH is for a random access response, a random access-RNTI (RA-RNTI) may be masked to the CRC. CRC masking (or scrambling) includes, for example, performing an XOR operation on CRC and RNTI at a bit level.

The PDCCH is transmitted on an aggregation of one or a plurality of consecutive control channel elements (CCEs). The CCE is a logical allocation unit used to provide a coding rate based on a wireless channel state to the PDCCH. The CCE corresponds to a plurality of resource element groups (REGs). For example, one CCE corresponds to 9 REGs, and one REG corresponds to 4 REs. Four QPSK symbols are mapped to the respective REGs. A resource element (RE) occupied by a reference signal (RS) is not included in the REG. Accordingly, the number of REGs in a given OFDM symbol varies depending on whether the RS exists. The concept of REG is also used in a different DL control channel (e.g., PCFICH and PHICH). The DCI format and the number of DCI bits are determined according to the number of CCEs.

The CCEs are numbered to be used consecutively. In order to simplify a decoding process, a PDCCH having a format consisting of n CCEs may start only in a CCE having a number which is a multiple of n. The number of CCEs used in transmission of a specific PDCCH, that is, a CCE aggregation level, is determined by the eNB according to a channel state. For example, in case of a PDCCH for a UE (e.g., adjacent to the eNB) having a good DL channel, one CCE may be sufficient. However, in case of a PDCCH for a UE (e.g., near a cell boundary) having a poor channel, 8 CCEs may be required to obtain sufficient robustness.

Figure 6:
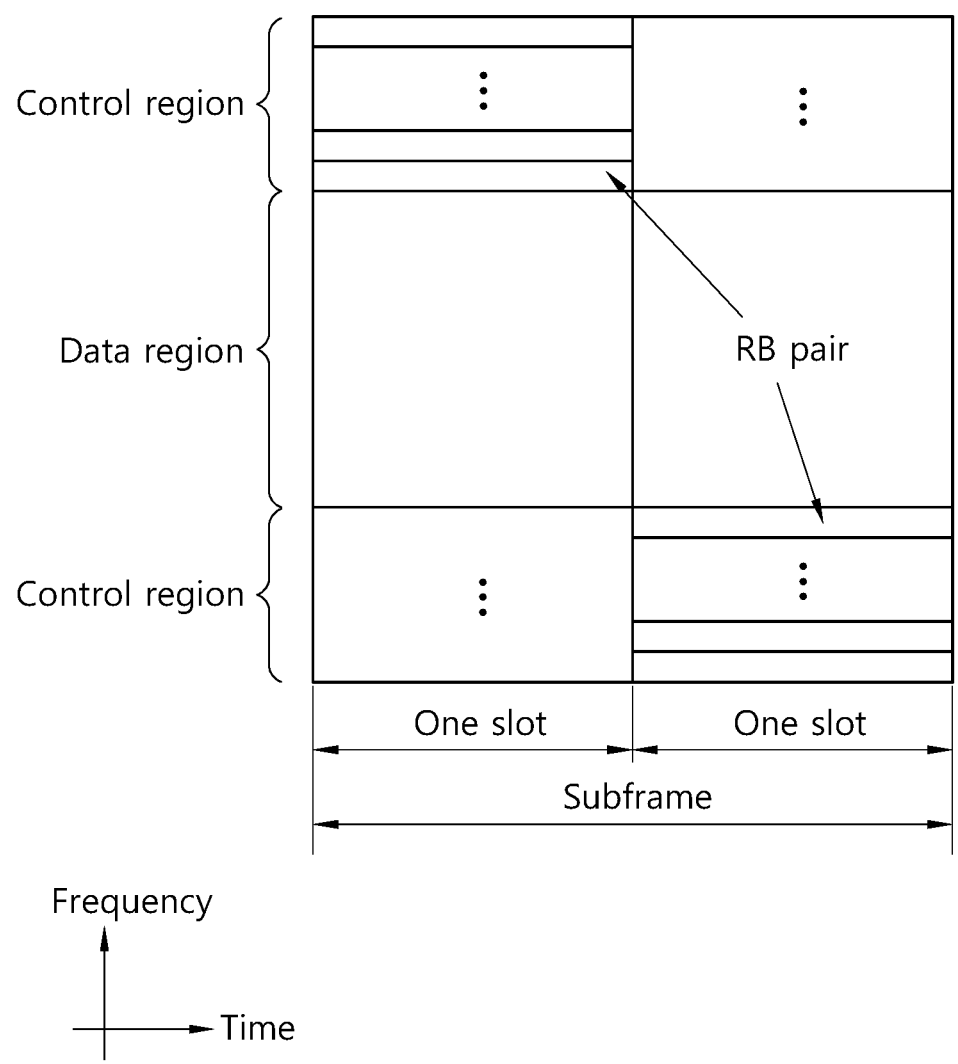
FIG. 6 shows an example of a UL subframe structure used in a 3GPP LTE(-A) system.

FIG. 6 shows an example of a UL subframe structure used in a 3GPP LTE(-A) system.

Referring to FIG. 6, the UL subframe may be divided into a control region and a data region in a frequency domain. One or several physical uplink control channels (PUCCHs) may be allocated to the control region to carry uplink control information (UCI). One or several physical uplink shared channels (PUSCHs) may be allocated to the data region of the UL subframe to carry user data. The control region and data region in the UL subframe may also be respectively called a PUCCH region and a PUSCH region. A sounding reference signal (SRS) may be allocated to the data region. The SRS is transmitted on an OFDM symbol located at a last part of the UL subframe in a time domain, and is transmitted on a data transmission band of the UL subframe, i.e., a data region, in a frequency domain. SRSs of several UEs transmitted/received on the last OFDM symbol of the same subframe can be distinguished according to a frequency position/sequence.

When a UE selects an SC-FDMA scheme in UL transmission, in order to maintain a single carrier characteristic, the PUCCH and the PUSCH cannot be simultaneously transmitted on one carrier in a 3GPP LTE release 8 or 9 system. In a 3GPP LTE release 10 system, whether simultaneous transmission of the PUCCH and the PUSCH is supported may be indicated in a higher layer.

In a subframe, the PUCCH may be allocated to an RB pair, and RBs belonging to the RB pair occupy different subcarriers in two slots. The PUCCH allocated in this manner is expressed such that an RB pair allocated to the PUCCH is frequency-hopped at a slot boundary.

Hereinafter, a new radio access technology (new RAT) will be described. The new RAT may also be simply referred to as new radio (NR).

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications. In addition, a communication system design considering services or terminals vulnerable to reliability or latency has also been discussed. An introduction of a next-generation RAT considering enhanced mobile broadband communication, massive MTC, ultra-reliable and low latency communication (URLLC), and the like, has been discussed, and in this disclosure, for the purposes of description, the corresponding technology will be termed new RAT or new radio (NR).

Figure 7:
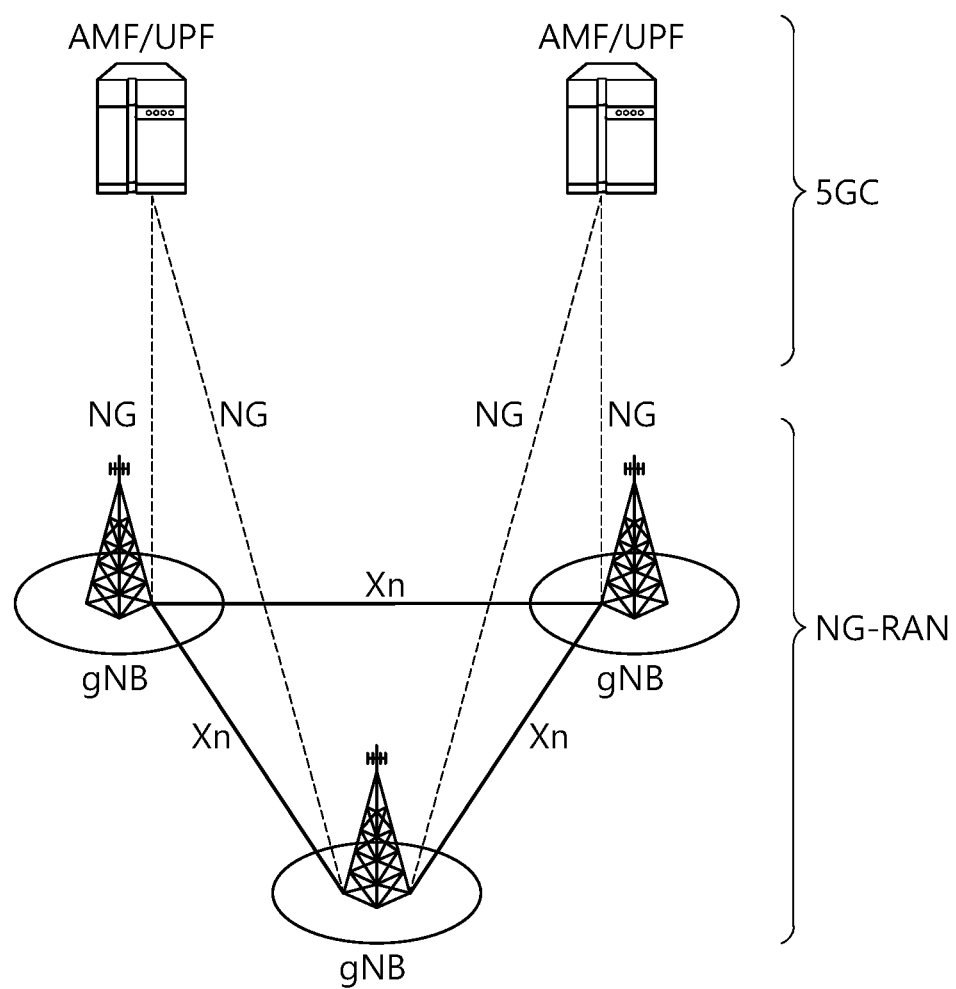
FIG. 7 illustrates a system structure of a next generation radio access network (NG-RAN) to which NR is applied.

FIG. 7 illustrates a system structure of a next generation radio access network (NG-RAN) to which NR is applied.

Referring to FIG. 7, the NG-RAN may include a gNB and/or an eNB that provides user plane and control plane protocol termination to a terminal. FIG. 7 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 8:
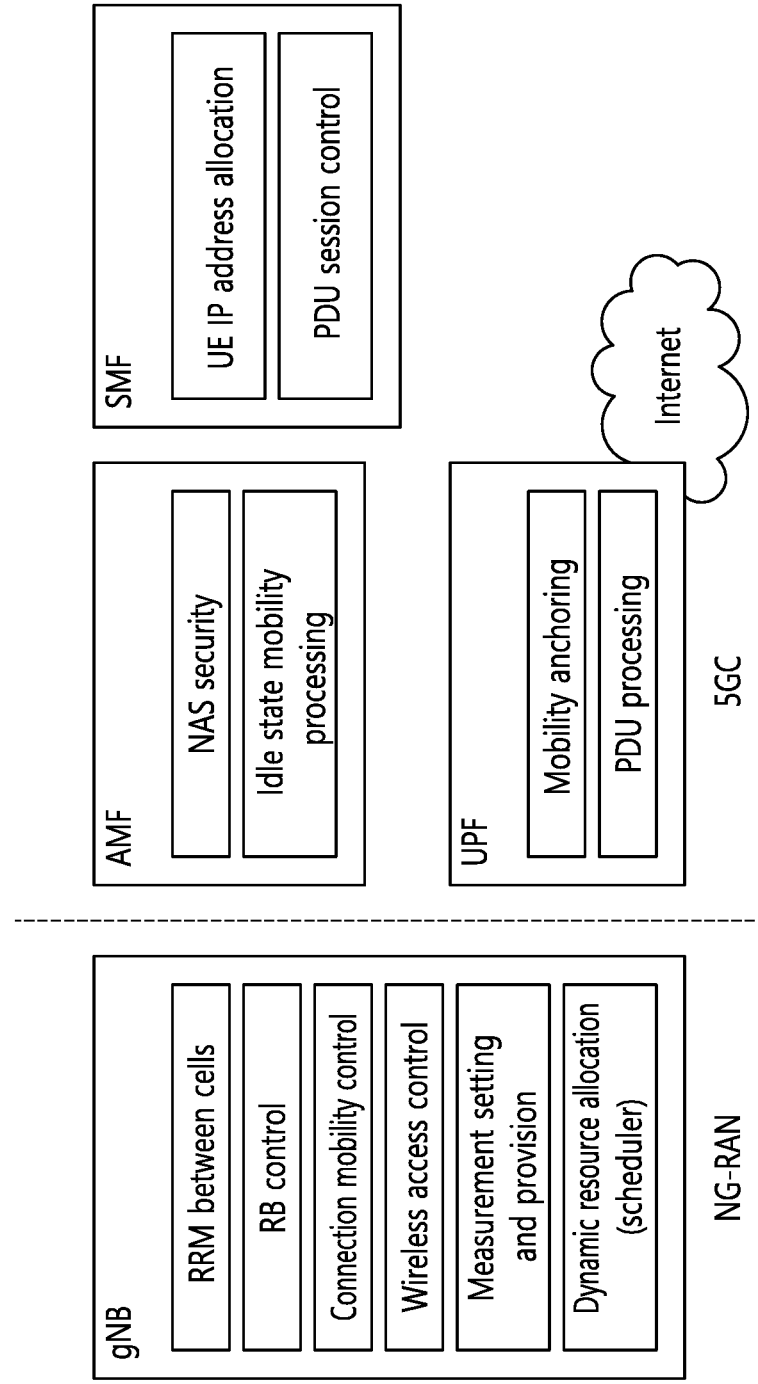
FIG. 8 illustrates a functional division between an NG-RAN and a SGC.

FIG. 8 illustrates a functional division between an NG-RAN and a 5GC.

Referring to FIG. 8, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 9:
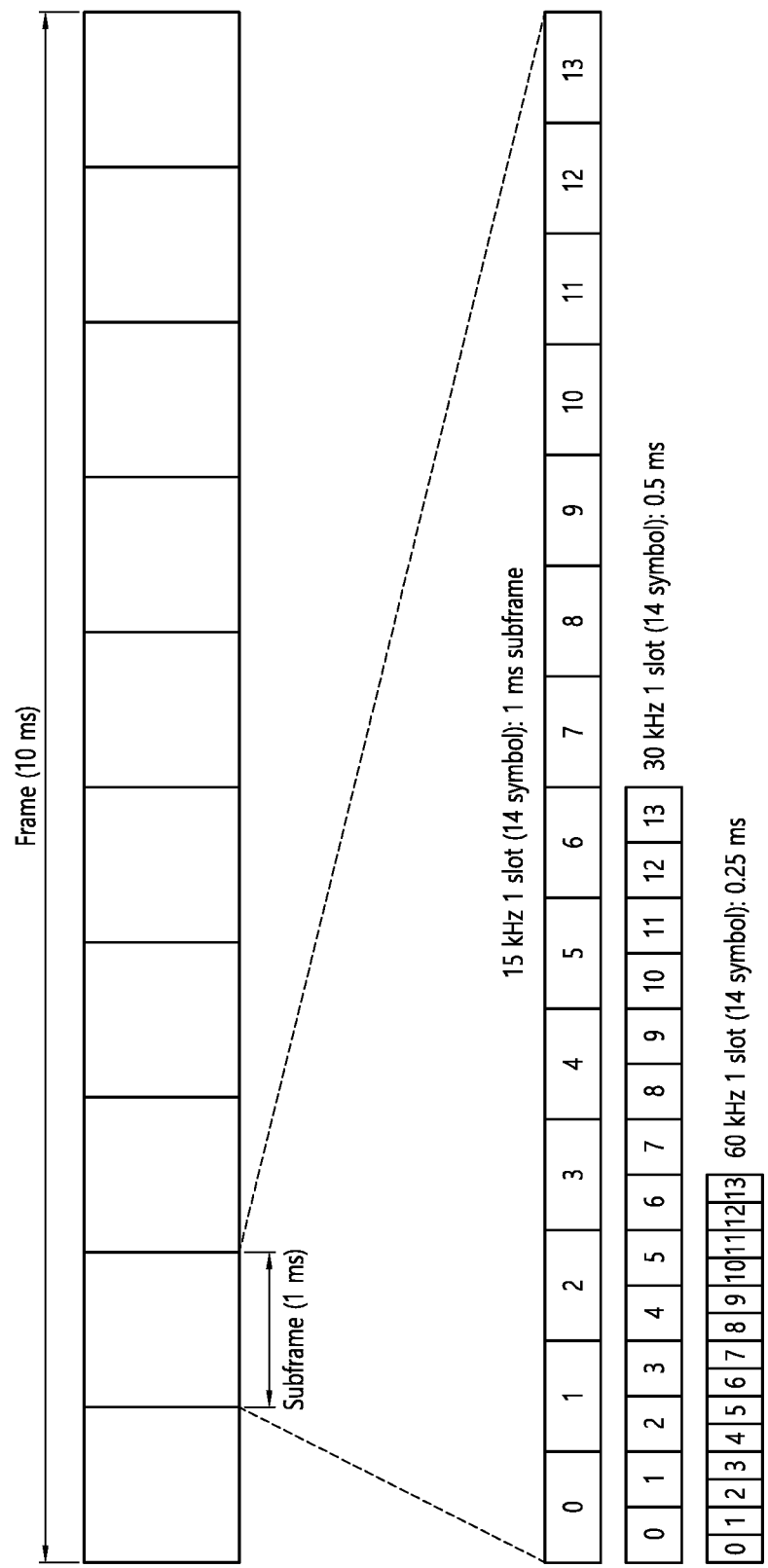
FIG. 9 illustrates a frame structure that may be applied in NR.

FIG. 9 illustrates a frame structure that may be applied in NR.

Referring to FIG. 9, a frame may be composed of 10 milliseconds (ms) and include 10 subframes each composed of 1 ms.

One or a plurality of slots may be included in a subframe according to subcarrier spacings.

The following table illustrates a subcarrier spacing configuration $\mu$.

TABLE 1

| $\mu$ | $\Delta f = 2^\mu \cdot 15$[kHz] | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

The following table illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations

TABLE 2

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |

TABLE 2-continued

| $\mu$ | $N^{slot}_{symb}$ | $N^{frame,\mu}_{slot}$ | $N^{subframe,\mu}_{slot}$ |
|---|---|---|---|
| 2 | 14 | 40 | 4 |
| 3 | 14 | 80 | 8 |
| 4 | 14 | 160 | 16 |

In FIG. 9, $\mu$=0, 1, 2 is illustrated.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in NR, a new unit called a control resource set (CORESET) may be introduced. The terminal may receive a control channel (for example, PDCCH) in the CORESET.

Figure 10:
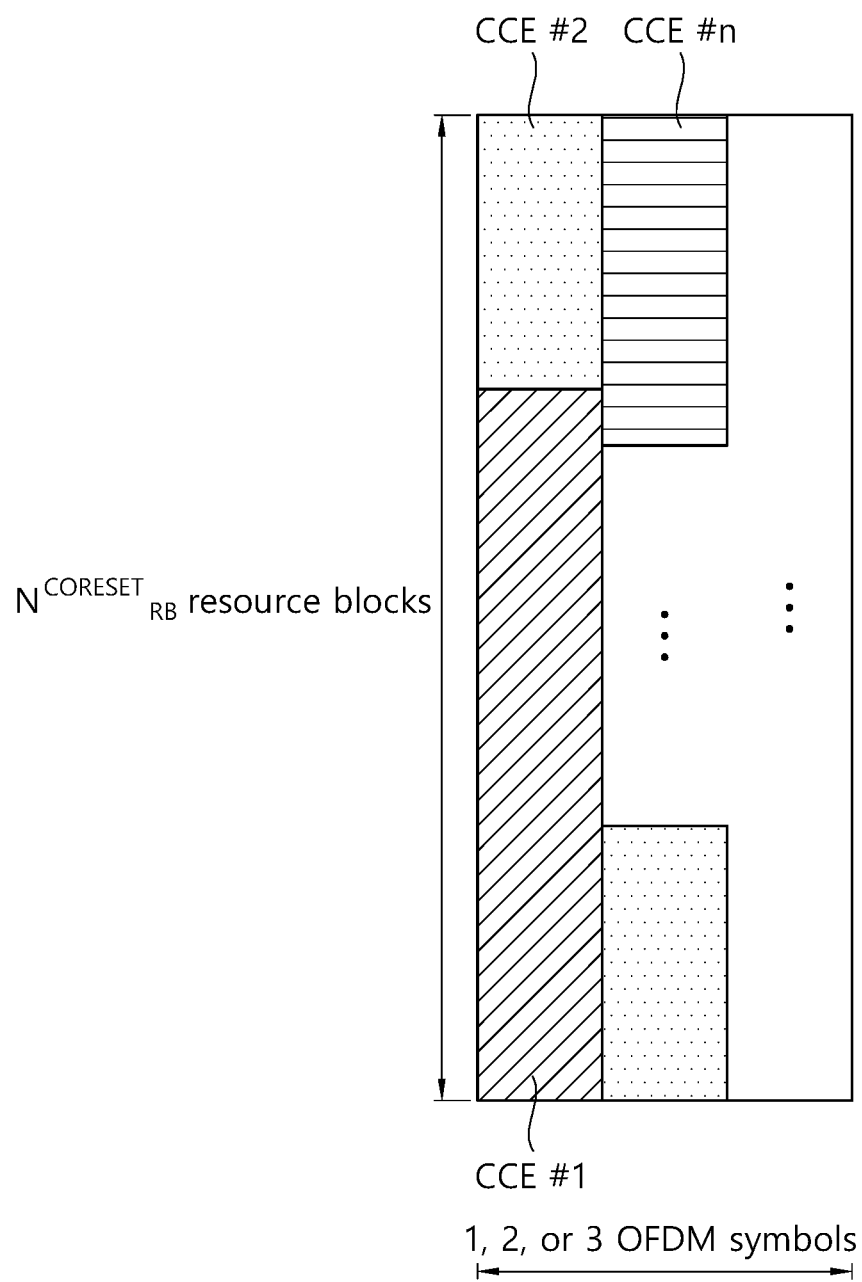
FIG. 10 illustrates CORESET.

FIG. 10 illustrates CORESET.

Referring to FIG. 10, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 10, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 11:
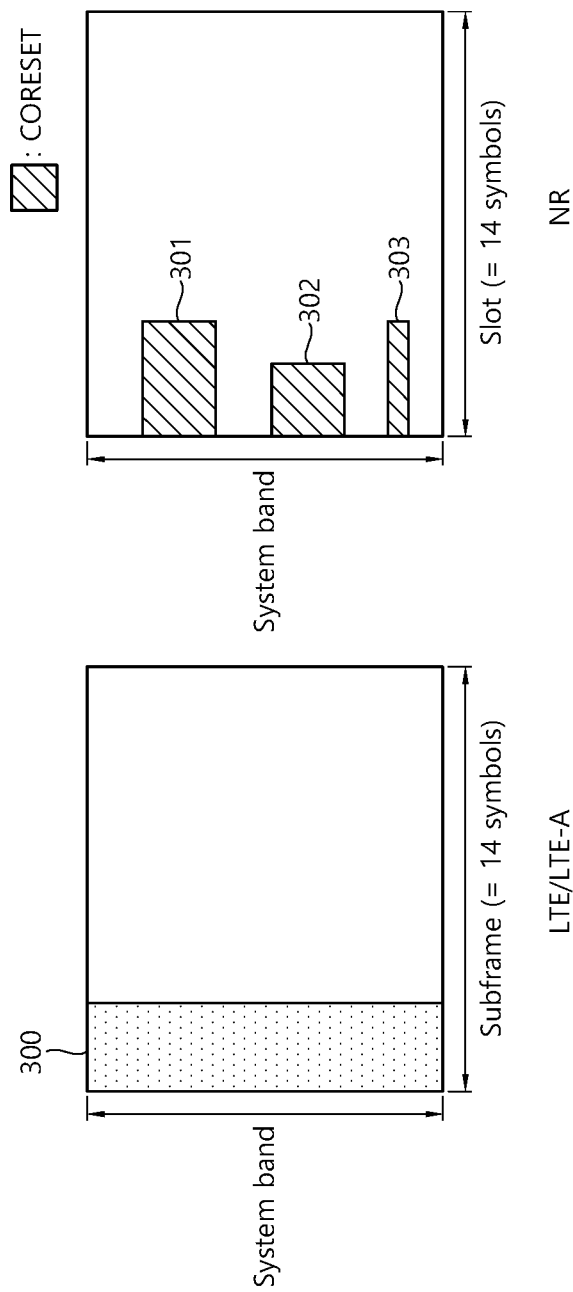
FIG. 11 is a diagram illustrating a difference between a related art control region and the CORESET in NR.

FIG. 11 is a diagram illustrating a difference between a related art control region and the CORESET in NR.

Referring to FIG. 11, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

In contrast, NR introduces the CORESET described above. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 11, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band The CORESET may include a UE-specific CORESET for transmitting UE-specific control information and a common CORESET for transmitting control information common to all UEs.

Meanwhile, in the NR, high reliability may be required according to an application field. In this situation, a target block error rate (BLER) for downlink control information (DCI) transmitted via a downlink control channel (e.g., a physical downlink control channel (PDCCH)) may be significantly lower than the conventional technique. As an example of a method for satisfying a requirement which requires the high reliability, an amount of contents included in the DCI may be decreased and/or an amount of resources used in DCI transmission may be increased. In this case, the resource may include at least one of a resource in a time domain, a resource in a frequency domain, a resource in a code domain, and a resource in a spatial domain.

In the NR, the following technique/feature may be applied.

<Self-Contained Subframe Structure>

In 5G NR, for the purpose of minimizing a latency, a structure in which a control channel and a data channel are subjected to TDM as shown in the following figure may be considered as one of frame structures. That is, in order to minimize a data transmission latency in a TDD system, a self-contained subframe structure is considered in the 5G NR.

Figure 12:
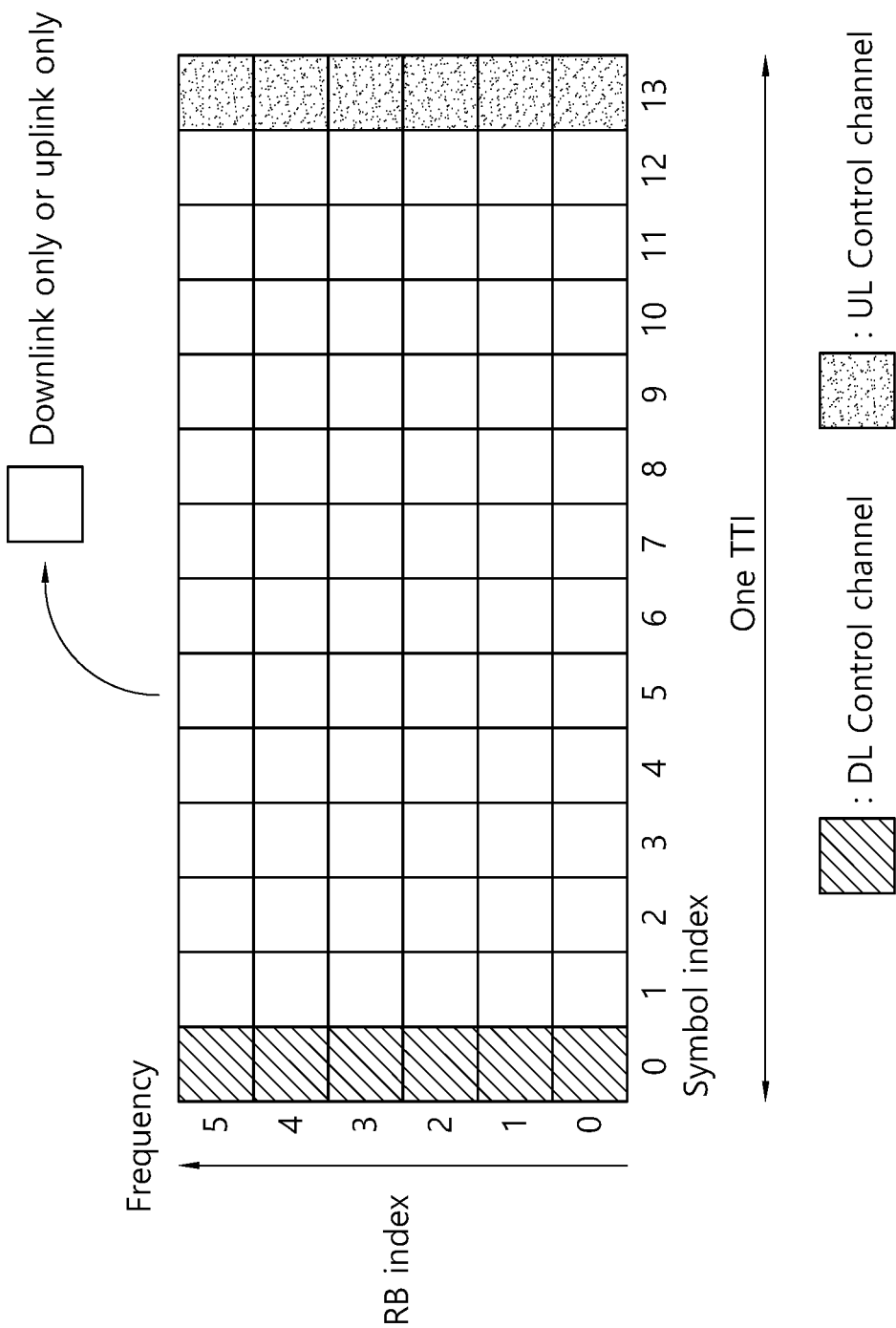
FIG. 12 briefly illustrates an example of a frame structure based on a structure in which a data channel and a control channel are subjected to time division multiplexing (TDM).

FIG. 12 briefly illustrates an example of a frame structure based on a structure in which a data channel and a control channel are subjected to time division multiplexing (TDM).

Referring to FIG. 12, as an example of the frame structure, one subframe (herein, a subframe may be interchangeably termed as a transmission time interval (TTI)) may be expressed based on an index of a resource block (RB) and an index of a symbol. In this case, one TTI may include a region related to a downlink control channel, a region related to an uplink control channel, and a downlink or uplink region.

For example, referring to a TTI structure of FIG. 12, a hatched region represents a downlink control region, and a black region represents an uplink control region. An unmarked region may be used for downlink data transmission or for uplink data transmission. Such a structure is characterized in that downlink (DL) transmission and uplink (UL) transmission are sequentially performed in one subframe, and thus DL data can be transmitted and UL acknowledged (ACK)/not acknowledged (NACK) can be received in the subframe. As a result, a time required until data is retransmitted is reduced when a data transmission error occurs, thereby minimizing a latency of final data transmission.

In such a data and control TDMed subframe structure (i.e., the self-contained subframe structure), a time gap is required for a process in which a gNB and a UE performs switching from a transmission mode to a reception mode or switching from the reception mode to the transmission mode. For this, some OFDM symbols at a time of switching from DL to UL in the subframe structure are set to a guard period (GP).

<Analog Beamforming>

In case of mmW, a wavelength is decreased, and thus a plurality of antennas can be installed in the same area. That is, a wavelength is 1 cm in a band of 30 GHz, and 100 antenna elements can be installed in total in a form of a 2-dimensional array with an interval of 0.5 lambda (wavelength) on a panel of 5 by 5 cm. Therefore, in case of mmW, a plurality of antenna elements are used to increase a beamforming (BF) gain, thereby increase coverage or increasing throughput.

In this case, if each antenna element has a transceiver unit (TXRU) to enable Tx power and phase adjustment, independent beamforming is possible for each frequency resource. However, it is not cost effective to install the TXRU to all of about 100 antennas elements. Therefore, a method is considered in which a plurality of antenna elements are mapped to one TXRU, and a beam direction is adjusted with an analog phase shifter. Such an analog beamforming scheme has a disadvantage in that frequency selective beaming is not possible since only one beam direction can be created in the entire band.

Hybrid beamforming (BF) having B TXRUs, where B is less than the number Q of antenna elements, may be considered as an intermediate form of digital BF and analog BF. In this case, although there is a difference depending on a connection mechanism of the B TXRUs and the Q antenna elements, a direction of a beam which can be transmitted at the same time is limited to be less than or equal to B.

The present disclosure describes a proposed method based on a new RAT (NR) system for convenience of explanations. However, a scope of a system to which the proposed method is applied can be extended to another system such as a 3GPP LTE/LTE-A system or the like in addition to the new RAT system.

Hereinafter, integrated access and backhaul (IAB) will be described.

One of potential technologies enabling future cellular network deployment scenarios and applications supports wireless backhaul and relay links so that NR cells are deployed flexibly and densely without transmission networks densely deployed.

In the NR, a massive MIMO or multi-beam system may be used/deployed by default, and a bandwidth expected to be used in the NR is greater than in LTE. Therefore, an IAB link is required to implement a plurality of control and data channels/procedures defined to provide an access for a UE.

In an IAB environment, resource direction contention shall be minimized to avoid interference between a plurality of nodes and UEs. For example, it is assumed that a resource allocated by a first UE to transmit a UL signal to a first node at the same time and the same frequency band is a UL resource (U resource), and a resource allocated by a second UE to receive a DL signal from a second node is a DL resource (D resource). In this case, a UL signal transmitted by using the resource allocated to the first UE may act as interference in the resource allocated to the second UE.

Of course, although various interference factors may exist in the IAB environment, if a resource direction can be defined to minimize interference between the nodes/UEs, reliability and performance of an IAB system can be more guaranteed.

Hereinafter, a radio link between the UE and a relay node or between the UE and a gNB node may be called an access link, and a radio link between the relay node or the gNB node and another relay node or the gNB node may be called a backhaul link. At least one gNB node or relay node may be connected with a core network in a wired manner.

The access link and the backhaul link may use the same or different frequency bands.

Meanwhile, operating an NR system in an mmW spectrum may lead to experiencing severe blocking (short-term blocking) that may not be mitigated by the present RRC-based handover mechanisms. Overcoming the short-term blocking may require an RAN-based mechanism so that fast switching is achieved between relay nodes (or gNB nodes, the same applies hereinafter).

To this end, there is a need for an integrated framework which allows fast switching of access and backhaul links. Over-the-air (OTA) coordination between relay nodes may be considered to mitigate interference and support end-to-end route selection and optimization.

The following requirements and aspects shall be considered in IAB for NR.

Figure 13:
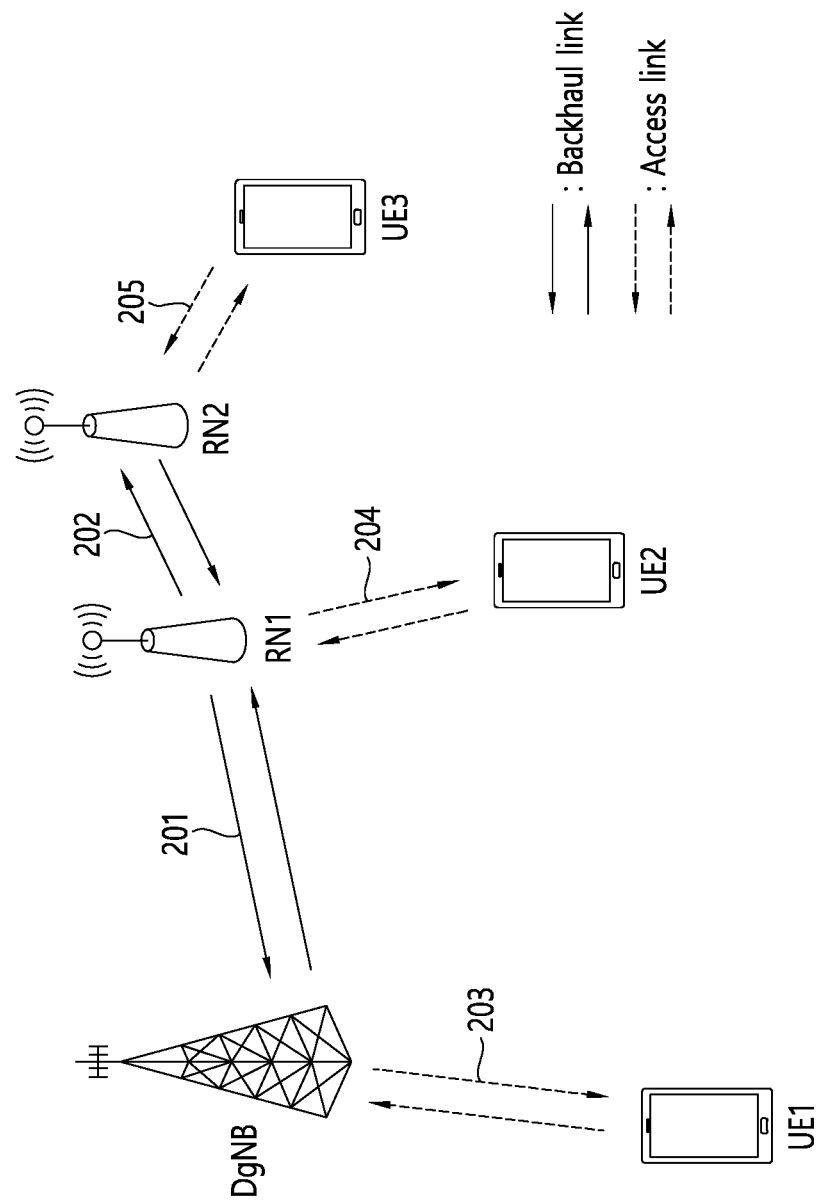
FIG. 13 exemplifies a system including a gNB, a relay node, and a UE in an IAB environment.

1) Efficient and flexible operation for both in-band and out-band relaying in indoor and outdoor scenarios, 2) Multi-hop and redundant connectivity, 3) End-to-end route selection and optimization, 4) Support of backhaul links with high spectral efficiency, and 5) Support of legacy NR UEs FIG. 13 exemplifies a system including a gNB, a relay node, and a UE in an IAB environment.

In an IAB scenario, half-duplex may be supported. In addition, in the IAB scenario, full-duplex may be supported.

If each relay node (RN) does not have scheduling ability, a gNB (i.e., DgNB) shall schedule all links between the DgNB and associated RNs and UEs. In other words, the DgNB may collect traffic information from all associated RNs to make a scheduling decision for all links and then may inform scheduling information to each RN.

For example, backhaul and access links may be configured as shown in FIG. 13. In this case, the DgNB may receive not only a scheduling request of a UE 1 but also a scheduling request of a UE 2 and UE 3. Therefore, a scheduling decision of two backhaul links 201 and 202 and three access links 203, 204, and 205 may be made, and scheduling results may be informed. Such centralized scheduling may involve a scheduling delay and a latency issue.

On the other hand, distributed scheduling may be achieved if each RN has scheduling ability. Then, immediate scheduling may be achieved for an uplink scheduling request of a UE, and backhaul/access links may be utilized more flexibly by reflecting a surrounding traffic situation.

Now, the present disclosure will be described.

The present disclosure proposes a method in which an IAB node performs initial access when a radio backhaul link is supported in an NR environment. The present disclosure also proposes a method of scheduling/coordinating a transmission/reception direction and a transmission/reception timing between links in an IAB environment.

Although an in-band environment is assumed in the following description, the present disclosure is also applicable to an out-band environment. In addition, although an environment where a donor gNB (DgNB), a relay node (RN), and a UE perform a half-duplex operation is considered in the following description, the present disclosure is also applicable to an environment where the DgNB, the RN, and/or the UE perform a full-duplex operation.

In the present disclosure, for convenience of explanations, in the presence of an RN1 and an RN2, when the RN1 is connected with the RN2 via a backhaul link to relay transmission/reception data to the RN2, the RN1 is called a parent node of the RN2, and the RN2 is called a child node of the RN1.

<Section A. Synchronization of DgNB and RN>

In an IAB environment, synchronization for transmission (Tx)/reception (Rx) timing with respect to a DgNB and an RN may be performed by at least one of methods described below. In particular, the content of the present disclosure includes a case where Rx timing is faster than or different from Tx timing by a specific offset by considering a time required to switch a node from Rx to Tx.

A-1. Method in which DgNB and RNs have absolutely identical timing

A DgNB and RNs may have absolutely identical frame timing through, for example, global navigation satellite system (GNSS)-based synchronization. For example, for the DgNB and the RNs, a slot boundary of access links of respective nodes may have the same timing.

Figure 14:
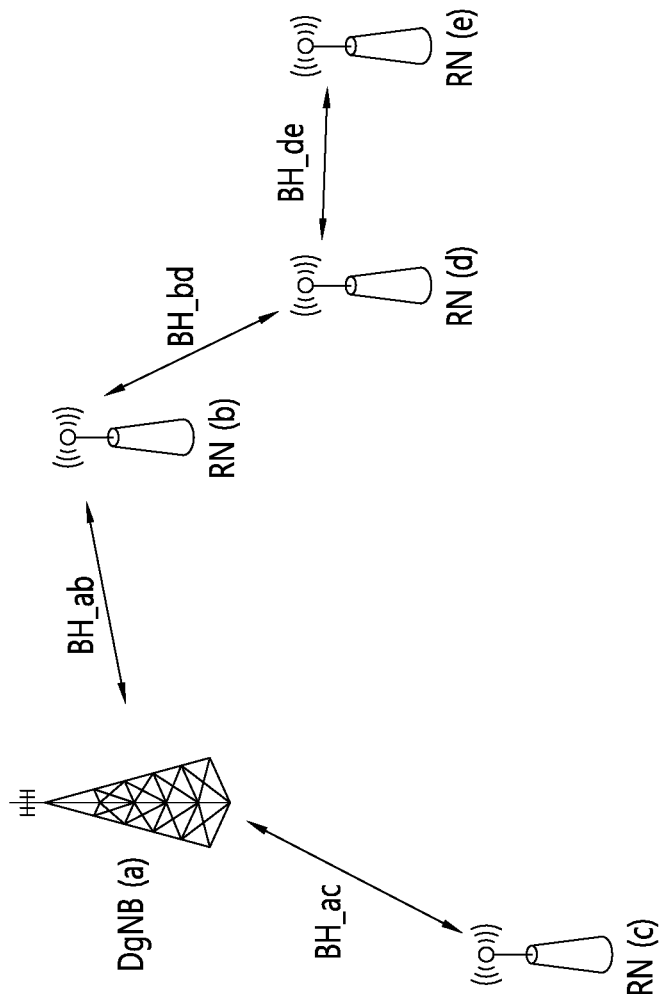
FIG. 14 exemplifies a wireless communication system including a DgNB and a relay node (hereinafter, also referred to as an IAB relay node or RN).

FIG. 14 exemplifies a wireless communication system including a DgNB and a relay node (hereinafter, also referred to as an IAB relay node or RN).

Referring to FIG. 14, a DgNB(a) may be connected with an RN(b) and an RN(c) via a backhaul link. A backhaul link of the DgNB(a) and RN(b) may be denoted by BH_ab, and a backhaul link of the DgNB(a) and RN(c) may be denoted by BH_ac. The RN(b) may be connected with an RN(d) via a backhaul link. The RN(d) may be connected with an RN(e) via a backhaul link. A backhaul link of the RN(b) and RN(d) may be denoted by BH_bd, and a backhaul link of the RN(d) and RN(e) may be denoted by BH_de.

As shown in FIG. 14, in the presence of a DgNB and at least one RN, DL (Tx)/UL (Rx) timing of an access link for the DgNB and each RN will be described.

Figure 15:
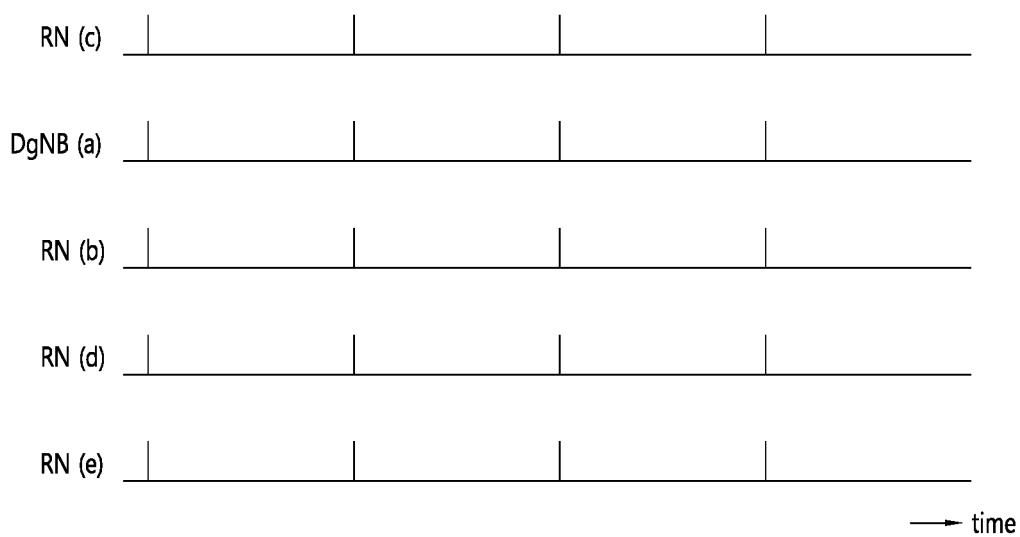
FIG. 15 exemplifies DL (Tx)/UL (Rx) timing of an access link in the DgNB and each RN of FIG. 14.

FIG. 15 exemplifies DL (Tx)/UL (Rx) timing of an access link in the DgNB and each RN of FIG. 14.

As shown in FIG. 15, access links of a DgNB and each RN may have DL (Tx)/UL (Rx) timing. The timing may be slot boundary/frame timing used when each RN supports the access link. The following scheme may be considered to match the timing.

1) Global synchronization through GNSS or the like

2) It may be considered to match synchronization on the basis of a signal transmitted from a DgNB and to remove a propagation delay on the basis of timing advance (TA). That is, a DgNB and an RN may estimate the propagation delay while exchanging a synchronization signal, and the propagation delay may be removed at a timing of receiving the signal transmitted from the DgNB. Alternatively, when a multi-hop situation is considered, it may be considered to match synchronization on the basis of a signal transmitted from a parent node instead of the DgNB, and to remove a propagation relay on the basis of the TA.

3) A timing is matched between a DgNB and RNs by using a precision time protocol (PTP), i.e., an IEEE 1588 standard time transmission time protocol or the like which can match synchronization via a message between cells. The IEEE 1588 standard time transmission protocol may allow accurate synchronization to be possible between networks.

A-2. Method in which RNs match timing based on synchronization signal of DgNB

RNs may receive a synchronization signal of a DgNB to perform over-the-air (OTA) synchronization. For example, each RN may receive a synchronization signal transmitted by the DgNB to perform DL synchronization, and may set this as a Tx/Rx timing of an access link/backhaul link of an RN (a backhaul link between a RN and a child node). Therefore, when there is a propagation delay between the DgNB and a specific RN, a slot boundary of the access link/backhaul link of the RN may be delayed by a propagation delay value in comparison with a slot boundary of an access link of the DgNB.

Figure 16:
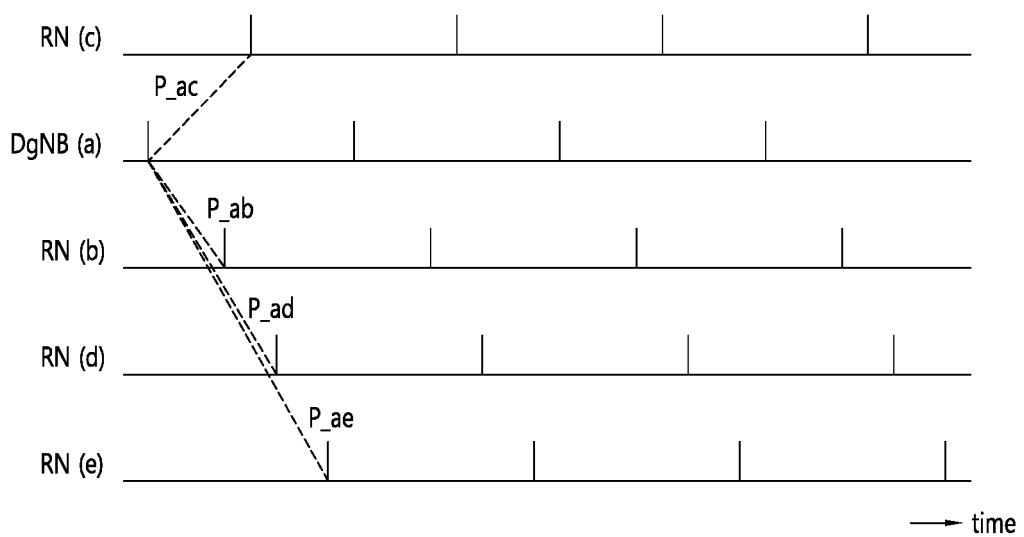
FIG. 16 shows another example of a DL (Tx)/UL (Rx) timing of an access link in a DgNB and each RN of FIG. 14.

FIG. 16 shows another example of a DL (Tx)/UL (Rx) timing of an access link in a DgNB and each RN of FIG. 14.

That is, in the presence of a DgNB and IAB RNs as shown in FIG. 14, it is assumed that a propagation delay for an RN(x) from a DgNB(a) is denoted by P_ax (e.g., P_ac if x is c). Then, the DL (Tx)/UL (Rx) timing of an access link/backhaul link of the RN(x) is delayed by P_ax in comparison with the DL (Tx)/UL (Rx) timing of the DgNB as shown in FIG. 16.

A-3. Method in which RNs match timing based on synchronization signal of parent node Each RN may receive a synchronization signal transmitted by a parent node thereof to perform OTA synchronization. For example, each RN may receive the synchronization signal transmitted by the parent node thereof to perform DL synchronization, and may set this as a timing of an access link. Therefore, when there is a propagation delay between an RN and a parent node of the RN, a slot boundary of an access link of the RN may be delayed by a propagation delay value in comparison with a slot boundary of an access link of the parent node.

Figure 17:
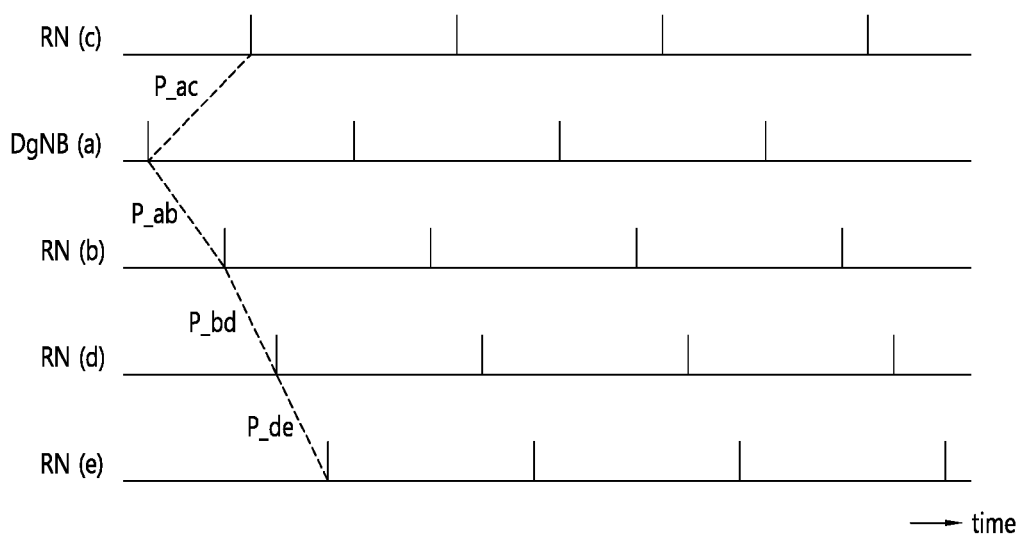
FIG. 17 shows another example of a DL (Tx)/UL (Rx) timing of an access link in a DgNB and each RN of FIG. 14.

FIG. 17 shows another example of a DL (Tx)/UL (Rx) timing of an access link in a DgNB and each RN of FIG. 14.

In the presence of a DgNB and IAB RNs as shown in FIG. 14, it is assumed that a propagation delay for an RN(y) from an RN(x) is denoted by P_xy. When the RN(x) is a parent node of the RN(y), a DL (Tx)/UL (Rx) timing of an access link of the RN(y) is delayed by P_xy in comparison with a DL (Tx)/UL (Rx) timing of the RN(x) as shown in FIG. 17.

Meanwhile, each RN may receive a synchronization signal transmitted by a parent node thereof to perform synchronization, and may set this as an Rx (UL) timing of an access/backhaul link operated by the RN. In addition, a timing at which TA is applied in accordance with an Rx timing of the parent node may be set as a Tx (DL) timing of an access/backhaul link operated by the RN. In this case, a Tx timing of the RN may not coincide with an Rx timing thereof.

In particular, a timing setting method may be different between the backhaul link and the access link. For example, the access link and the backhaul link may be subjected to time division multiplexing (TDM), and a timing may be set by using the aforementioned method A-1 or A-2 in case of the access link, whereas the timing may be set by using the method A-3 in case of the backhaul link.

<Section B. Initial access of IAB RN>

When an IAB RN is initially set up, the IAB RN may establish a connection with a parent RN thereof (or a DgNB or another RN) and thereafter may play a role as the RN. An initial setup process of the IAB RN may include at least one of the following processes.

B-1. When performing initial access using SSB via access link of parent node

An IAB RN may perform initial access by receiving an SS/PBCH block (SSB) transmitted by a parent node via an access link. In this case, specifically, the initial access may be performed as follows.

Figure 18:
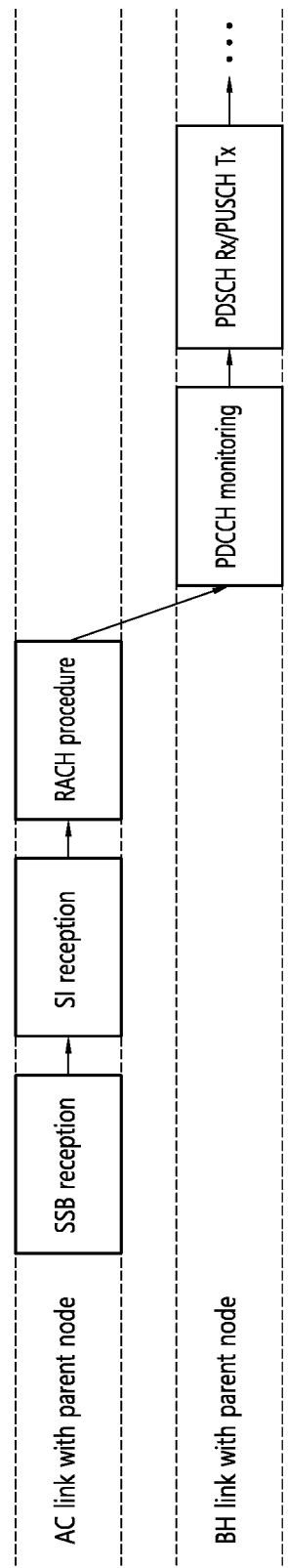
FIG. 18 exemplifies a process of performing initial access according to the method 1.

[Method 1] Method of switching to backhaul link in initial access process of IAB node after RACH procedure FIG. 18 exemplifies a process of performing initial access according to the method 1.

Referring to FIG. 18, an IAB node (RN) may perform processes such as SSB reception, SI reception, RACH procedure, PDCCH monitoring, PDSCH reception/PUSCH transmission or the like in a link described below.

(a) SSB reception (via access link)

An IAB RN may receive SSB transmitted via an access link (=through a resource/timing/protocol allocated to the access link, the same applies hereinafter) to set a DL timing (Rx timing) of an access link between a parent node and a corresponding RN. In this case, receiving the SSB may include receiving only a synchronization signal.

(b) System Information Reception (via Access Link)

An RN which performs DL synchronization for an access link with a parent node and thus be able to receive DL data may receive system information required for the RN from the parent node via the access link. In this case, the RN may receive a PRACH resource configuration via the access link, and a PRACH resource may exist in the access link. Herein, when it is said that the resource exists within the access link, it may imply that the resource conforms to a resource, DL/UL timing, and protocol used in the access link.

An RN which performs DL synchronization for an access link with a parent node and thus be able to receive DL data may receive system information required for the RN from the parent node via the access link.

In this case, the RN may receive a PRACH resource configuration via the access link, and a PRACH resource may exist in the access link. Herein, when it is said that the resource exists within the access link, it may imply that the resource conforms to a DL/UL timing and protocol used in the access link. The PRACH resource for the RN may be configured separately from a PRACH resource used by the UE.

A PRACH (also referred to as RACH) resource configuration method will be described.

Alt 1: Method of sharing RACH resource by RN and UE

In this method, an RN accesses a parent node similarly to a UE. When an RACH resource is shared between the two (i.e., RN and UE), an RN-parent node (PN) pathloss may be different from a UE-PN pathloss. Therefore, power related to power of a PRACH used by the two links may be different. To this end, the following methods can be used.

i) Method in which RN and UE configure power parameter separately

For example, transmission power of PUSCH transmission may be determined based on parameters ('targetreceivedpower', 'Po', etc.) used when determining nominal PUSCH transmission power, a parameter (referred to as 'alpha') to be multiplied by a pathloss, or the like. In this case, a parameter related to 'targetreceivedpower' or 'P0' & 'alpha' may be configured differently in the RN and the UE. ii) As a parameter related to power, a parameter used in the RN may be derived based on a parameter configured in the UE. For example, a different parameter may be created in such a manner that a specific offset is added or multiplied to all parameters. For example, the different parameter may be created by decreasing 'targetreceivedpower' for the RN (i.e., a minus offset) or multiplying a specific value (e.g., offset=1.1) to PO. Alternatively, the offset value may be transmitted for the RN through a different signal. iii) A power parameter of the UE/RN may be shared. In this method, the RN assumes that different channels are applied to calculate a pathloss.

Alt 2: Method in which RN and UE configure RACH resource separately

Even if an RACH resource is configured separately, a response for an RN and a UE may be given by being multiplexed to a random access response (RAR).

In case of the RN, SIB update (reported via the access link) may be ignored. This is an assumption in which, once a connection is established, every signaling is performed via the backhaul link. Accordingly, it may not be assumed that the RN conforms to system information update (reported via the access link).

(c) RACH Procedure (via Access Link)

Figure 19:
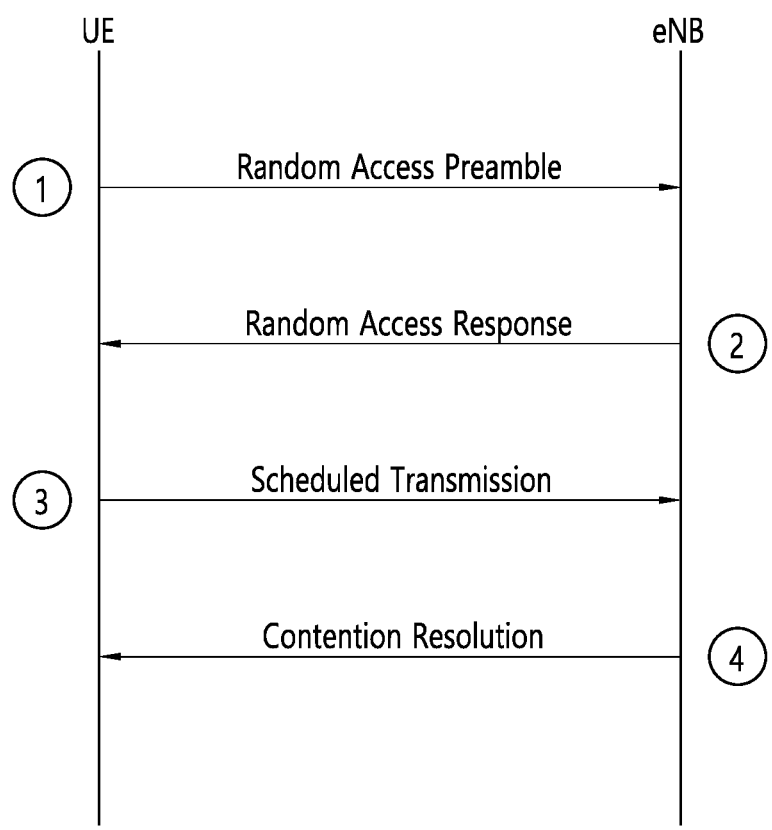
FIG. 19 exemplifies an RACH procedure.

FIG. 19 exemplifies an RACH procedure.

Referring to FIG. 19, an RACH procedure or a random access procedure may include the following four steps. Messages transmitted in steps 1 to 4 may be respectively referred to as Msg1 to Msg4.

Step 1: RACH preamble (via PRACH) (UE (IAB node) =>eNB). This may be referred to as Msg1.

Step 2: Random access response (RAR) (via PDCCH and PDSCH) (eNB=>UE (IAB node)). This may be referred to as Msg2.

Step 3: Scheduled transmission (via PUSCH) (UE (IAB node)=>eNB). This may be referred to as Msg3.

Step 4: Contention resolution message (eNB=>UE (IAB node)). This may be referred to as Msg4.

Each step will be described in detail. In a (contention-based) random access process, a UE randomly selects one random access preamble from a set of random access preambles indicated via system information or a handover command, and selects a PRACH resource capable of transmitting the random access preamble and then performs transmission.

After the UE transmits the random access preamble as described above, an eNB attempts to receive a random access response thereof within a random access response reception window indicated via the system information or the handover command. Random access response information is transferred in a format of MAC PDU, and the MAC PDU may be transferred via a PDSCH. In addition, a PDCCH is also transferred so that the UE properly receives information transferred via the PDSCH. That is, the PDCCH includes information of a UE which needs to receive the PDSCH, frequency and time information of a radio resource of the PDSCH, a transmission format of the PDSCH, or the like. Once the UE successfully receives the PDCCH transferred to the UE, a random access response transmitted via the PDSCH is properly received according to information of the PDCCH. In addition, the random access response includes a random access preamble identifier (ID), a UL grant (UL radio resource), a temporary C-RNTI, (temporary cell ID and a time alignment command (hereinafter, TAC). The random access preamble ID is required to report a specific UE for which the UL grant, the temporary C-RNTI, and the TAC are valid, because one random access response may include random access response information for one or more UEs. The random access preamble ID coincides with the random access preamble selected by the UE in the step 1.

If the UE receives the random access response valid for the UE, each of a plurality of pieces of information included in the random access response is processed. That is, the UE applies the TAC, and stores the temporary C-RNTI. In addition, data stored in a buffer of the UE or newly generated data is transmitted to the eNB by using the UL grant. In this case, a UE ID is necessarily included in data included in the UL grant. This is because the eNB cannot determine specific UEs which will perform the random access process in the contention-based random access process, but there is a need to identify the UE for contention resolution at a later time. Upon transmitting the data through the UL grant, the UE starts a contention resolution timer.

After transmitting the data including the UE ID via the UL grant included in the random access response, the UE waits for an instruction of the eNB for contention resolution. That is, PDCCH reception is attempted to receive a specific message. If the PDCCH is received via a cell ID of the UE before the contention resolution timer expires, the UE determines that the random access process has been normally performed, and thus ends the random access process. Alternatively, if the PDCCH is received via the temporary cell ID before the contention resolution timer expires, data transferred by a PDSCH indicated by the PDCCH is confirmed. If contention of the data is included in a unique UE ID, the UE determines that the random access process has been normally performed, and thus ends the random access process.

Returning to FIG. 18, the RN uses a configured RRACH resource to perform the aforementioned RACH procedure with the parent node. Through this process, a UL timing (Tx timing) may be set for an access link with the parent node.

In this case, the RN may receive a configuration related to a backhaul link with the parent node during the RACH procedure (e.g., via Msg4). Alternatively, the configuration may be received via system information (SI) or via RRC. The configuration related to the backhaul link with the parent node will be described in a greater detail in section C-1 below.

In addition, the RN may receive a configuration related to PDCCH reception in the backhaul link with the parent node during the RACH procedure (e.g., via Msg4). Alternatively, the configuration may be received via SI or via RRC. The configuration related to PDCCH reception in the backhaul link with the parent node will be described in a greater detail in section C-2 below.

A default configuration is used to perform data transmission/reception via the backhaul link until the aforementioned configuration is received, and a changed configuration may be applied at a later time when configured via SI/RRC or the like.

In particular, a search space (referred to as CSS2) in which the existing UE monitors RA-RNTI may be shared to receive the RA-RNTI. In addition, in case of each RN, TC-RNTI/C-RNTI may be allocated through the RACH procedure. The TC-RNTI/C-RNTI may be used between the RN and a PN in initial access, and may be used in a backhaul link after a connection is established. It may be assumed that sequence generation/multiplexing/configuration or the like may be used in the access/backhaul link on the basis of the aforementioned ID.

If the RN receives such a configuration from the parent node, a DL (Rx) timing/UL (Tx) timing in the backhaul link with the parent node can be known.

(d) Data communication via backhaul link

Upon receiving a configuration for data transmission/reception via a backhaul link, an RN may perform data transmission/reception with the parent node via the backhaul link.

(e) Slot Format Setup

An RN which has completed a backhaul link setup with a parent node necessarily prepares to support an RN with another UE. To this end, the RN may determine a configuration related to an access link in which the RN supports the UE and a backhaul link in which the RN becomes a parent node to support different RNs, and may transmit the configuration to the UE and RNs supported by the RN. Among these configurations, a configuration for the backhaul link will be described in detail in the section C-2 below, and the configuration for the access link will be described in detail in section C-3 below.

Figure 20:
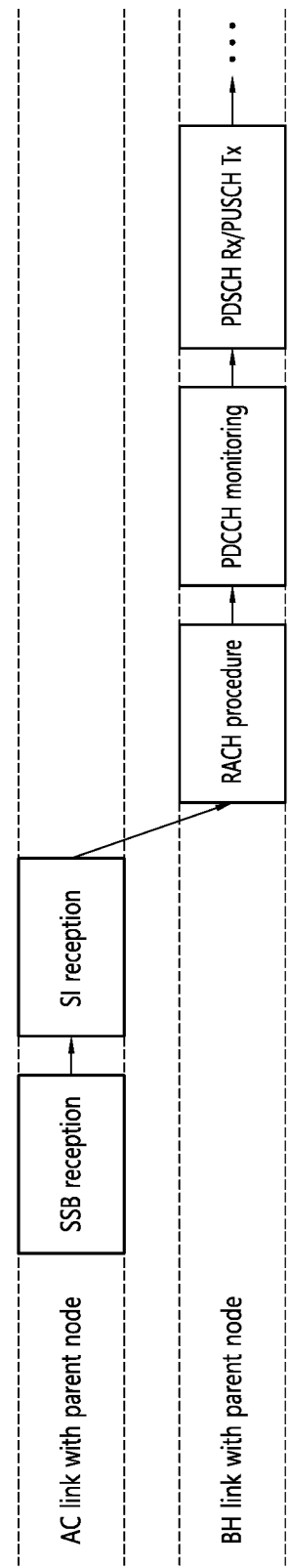
FIG. 20 exemplifies a process of performing initial access according to the method 2.

[Method 2] Method of switching to backhaul link ever since RACH procedure in initial access process of IAB node FIG. 20 exemplifies a process of performing initial access according to the method 2.

Referring to FIG. 20, an IAB node (RN) may perform processes such as SSB reception, SI reception, RACH procedure, PDCCH monitoring, PDSCH reception/PUSCH transmission or the like in a link described below. That is, the RN performs the process via an access link with a parent node until the RACH procedure, and may perform communication with the parent node via a backhaul link ever since the RACH procedure.

(a) SSB Reception (via Access Link)

An IAB RN may receive SSB transmitted by a parent node via an access link to set a DL timing (Rx timing) of the access link between the parent node and the RN. In this case, receiving the SSB includes receiving only a synchronization signal.

(b) System Information Reception (via Access Link)

An RN which performs DL synchronization for an access link with a parent node and thus be able to receive DL data may receive system information required for the RN from the parent node via the access link.

In this case, the RN may receive a PRACH (=RACH) resource configuration, and the PRACH resource may exist in the backhaul link. That is, the PRACH resource for the RNs may be configured separately from the PRACH resource for the UEs, and the PRACH resource for the RNs may exist in the backhaul link.

The RN may receive a configuration related to a backhaul link with a parent node via system information so that the backhaul link is used ever since the RACH procedure. Alternatively, such a configuration may be transmitted during the RACH procedure (e.g., via Msg4) at a later time or may be transmitted via RRC. The configuration related to the backhaul link with the parent node will be described in greater detail in the section C-1 below.

In addition, the RN may receive a configuration related to PDCCH reception in the backhaul link with the parent node via the system information. Alternatively, such a configuration may be used only for the RACH procedure, and a configuration related to a PDCCH for transmitting/receiving actual RN-specific data may be transmitted at a later time during the RACH procedure (e.g., via Msg4) or may be transmitted via RRC. The configuration related to PDCCH reception in the backhaul link with the parent node will be described in greater detail in the section C-2 below.

In particular, until the aforementioned configuration is received, a default configuration may be used to perform data transmission/reception via the backhaul link, and a changed configuration may be applied at a later time when configured via the Msg4/SI/RRC or the like.

If the RN receives such a configuration from the parent node, a DL (Rx) timing in the backhaul link with the parent node can be known.

Although the system information is transmitted via the access link, system information for RNs may be transmitted separately from the system information received by the UE. In particular, regarding both RMSI and OSI, SI for the UE and SI for the RN may be separately transmitted through separate resources. Alternatively, the RMSI may be received in common by the UE and the RN, whereas the OSI may be received separately by the UE and the RN.

(c) RACH Procedure via Backhaul Link

An RN may use a configured PRACH resource to perform an RACH procedure via a backhaul link with a parent node. Through this process, a UL timing (Tx timing) may be set for a backhaul link with the parent node.

In this case, the RN may receive a configuration related to a backhaul link with the parent node during the RACH procedure (e.g., via Msg4). The configuration related to the backhaul link with the parent node will be described in a greater detail in section C-1 below.

In addition, the RN may receive a configuration related to PDCCH reception in the backhaul link with the parent node during the RACH procedure (e.g., via Msg4). The configuration related to PDCCH reception in the backhaul link with the parent node will be described in a greater detail in section C-2 below.

In particular, a default configuration is used to perform data transmission/reception via the backhaul link until the aforementioned configuration is received, and a changed configuration may be applied at a later time when configured via SI/RRC or the like.

(d) Data Communication via Backhaul Link

An RN which has obtained a UL (Tx) timing in the backhaul link through the RACH procedure and also has obtained a configuration for data transmission/reception via the backhaul link may perform data transmission/reception via the backhaul link with the parent node.

(e) Slot Format Setup

An RN which has completed a backhaul link setup with a parent node necessarily prepares to support an RN with another UE. To this end, the RN may determine a configuration related to an access link in which the RN supports the UE and a backhaul link in which the RN supports different nodes. Among these configurations, a configuration for the backhaul link will be described in detail in the section C-2 below, and the configuration for the access link will be described in detail in section C-3 below.

When the method 2 is used, the RN may not know a UL timing in the access link with the parent node since the RACH procedure is performed via the backhaul link. Accordingly, if an operation for obtaining the UL timing in the access link with the parent node is not additionally performed or configured, only data/signal reception may be possible in the access link with the parent node, and transmission thereof may not be possible.

[Method 3] Method of switching to backhaul link ever since system information reception process in initial access process of IAB node.

Figure 21:
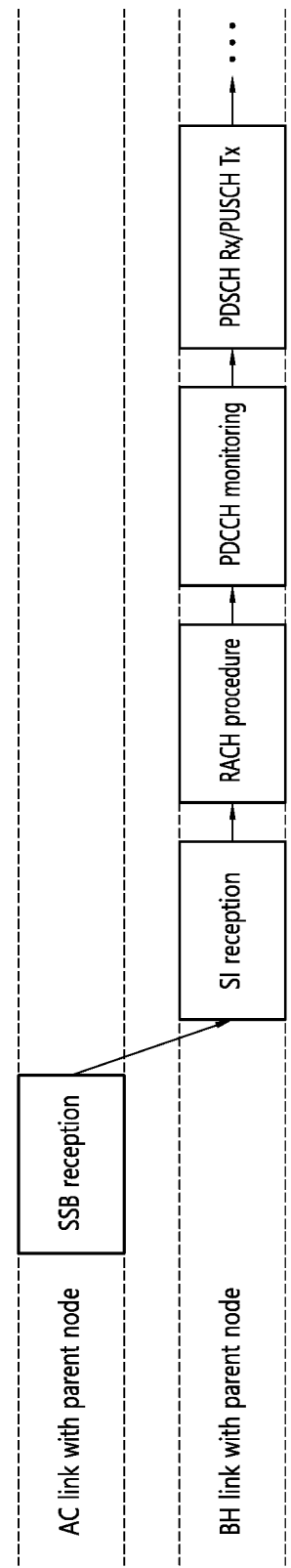
FIG. 21 exemplifies a process of performing initial access according to the method 3.

FIG. 21 exemplifies a process of performing initial access according to the method 3.

Referring to FIG. 21, an IAB node (RN) may perform processes such as SSB reception, SI reception, RACH procedure, PDCCH monitoring, PDSCH reception/PUSCH transmission or the like in a link described below. That is, the RN may perform the SSB reception process via an access link with a parent node, and may perform communication with the parent node via the backhaul link ever since the SI reception process.

(a) SSB Reception (via Access Link)

An RN may receive SSB transmitted by a parent node via an access link to set a DL timing (Rx timing) of an access link between the parent node and the RN. Receiving the SSB may include receiving only a synchronization signal.

(b) System Information Reception (via Backhaul Link)

An RN may receive system information (SI) from a parent node via a backhaul link at a later time. That is, SI transmission resources for RNs may be configured separately from SI transmission resources for UEs, and PRACH resources for the RNs may exist within a backhaul link. A PDCCH monitoring resource/PDSCH resource for obtaining the system information may be pre-defined and/or may be configured through a master information block (MIB). In addition, it may also be configured in the previously transmitted SI (e.g., a resource for transmitting SIB2 and/or a resource for monitoring a PDCCH to receive SIB2 may be configured in SIB1).

Regarding a configuration related to the backhaul link with the parent node and performed via the backhaul link ever since the system information reception process, 1) the RN may use a default configuration, and/or 2) the configuration may be provided via MIB. Such a configuration may be transmitted at a later time during the RACH procedure (e.g., via Msg4) or may be additionally transmitted via SI/RRC or may be reconfigured. The configuration related to the backhaul link with the parent node will be described in greater detail in the section C-1 below.

In addition, regarding a configuration related to PDCCH reception in the backhaul link with the patent node, 1) the RN may use a default configuration, and/or 2) the configuration may be provided via MIB. Such a configuration may be transmitted at a later time during the RACH procedure (e.g., via Msg4) or may be additionally transmitted via SI/RRC or may be reconfigured. The configuration related to PDCCH reception in the backhaul link with the parent node will be described in greater detail in the section C-2 below.

If the RN receives such a configuration from the parent node, a DL (Rx) timing in the backhaul link with the parent node can be known.

The RN may receive the system information from the parent node via the backhaul link by using the aforementioned configurations. In this case, the RN receives a PRACH resource configuration via SI, and the PRACH resource exists in the backhaul link. In particular, although the RN receives RMSI via the access link, OSI and information followed by the OSI may be received via the backhaul link ever since OSI.

(c) RACH Procedure via Backhaul Link

An RN may use a configured PRACH resource to perform an RACH procedure via a backhaul link with a parent node. Through this process, a UL timing (Tx timing) may be set for a backhaul link with the parent node.

(d) Data Communication via Backhaul Link

An RN which has obtained a UL (Tx) timing in the backhaul link through the RACH procedure and also has obtained a configuration for data transmission/reception via the backhaul link performs data transmission/reception via the backhaul link with the parent node.

(e) Slot Format Setup

An RN which has completed a backhaul link setup with a parent node necessarily prepares to support an RN with another UE. To this end, the RN may determine a configuration related to an access link in which the RN supports the UE and a backhaul link in which the RN supports different nodes. Among these configurations, a configuration for the backhaul link will be described in detail in the section C-2 below, and the configuration for the access link will be described in detail in section C-3 below.

When the method 3 is used, the RN may not know a UL timing in the access link with the parent node since the RACH procedure is performed via the backhaul link. Accordingly, if an operation for obtaining the UL timing in the access link with the parent node is not additionally performed or configured, only data/signal reception may be possible in the access link with the parent node, and transmission thereof may not be possible.

When the RN performs initial access by using the aforementioned methods, a gNB/RN needs to identify whether a device which attempts initial access to the gNB/RN is the UE or the RN.

Figure 22:
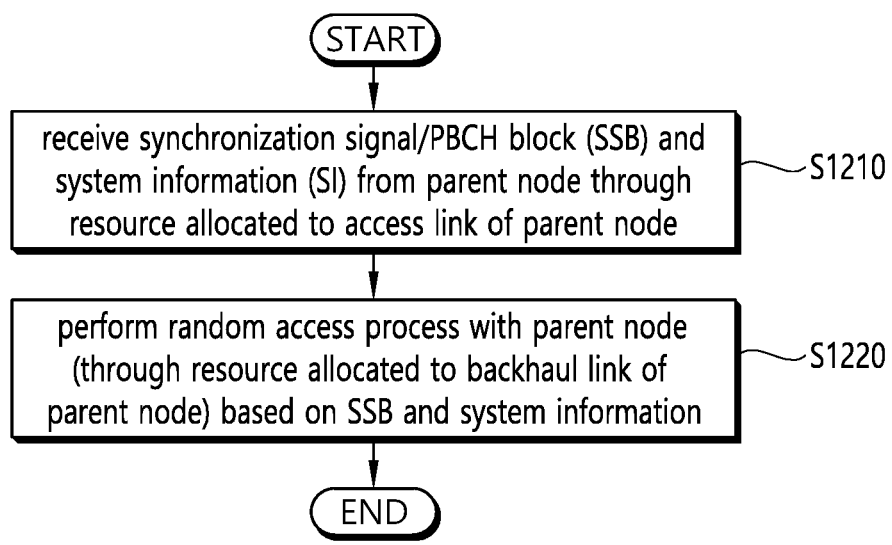
FIG. 22 exemplifies a method of operating an IAB node according to an embodiment of the present disclosure.

FIG. 22 exemplifies a method of operating an IAB node according to an embodiment of the present disclosure.

Referring to FIG. 22, an IAB node receives a synchronization signal/PBCH block (SSB) and system information from a parent node (S1210). In addition, a random access process is performed with the parent node based on the SSB and the system information (S1220).

In this case, the SSB and the system information may be received through a resource allocated to an access link of the parent node, and the random access process is performed through a resource allocated to a backhaul link of the parent node. As described above, the access link may be a communication link between the parent node and a UE served by the parent node, and the backhaul link may be a communication link between the parent node and the IAB node.

In addition, the random access process will be performed by using a resource determined differently according to whether the IAB node is the RN or the UE.

Hereinafter, methods capable of identifying whether the IAB node which attempts initial access to the parent node is the RN or the UE will be described in detail.

Method 1. Identification Through PRACH Resource

A PRACH resource may be configured differently according to a type of a device (RN or UE) which attempts access to a gNB/RN. In this case, the gNB/RN may determine the type of the device which transmits a PRACH according to a resource for receiving the PRACH.

In the random access process, the preamble may be transmitted by using a format/resource shown in the following table.

TABLE 4

| Format number | Sequence length | Subcarrier spacing | Time duration | Bandwidth |
| --- | --- | --- | --- | --- |
| 0 | 839 | 1.25 kHz | 1 subframe | 1.05 MHz |
| 1 | | | 3 subframes | |
| 2 | | | 3.5 subframes | |
| 3 | | 5 kHz | 1 subframe | 4.20 MHz |
| A1 | 139 | {15, 30, | 2 symbols | {2.09, 4.17, |
| A2 | | 60, 120} | 4 symbols | 8.34, 16.68} |
| A3 | | kHz | 6 symbols | MHz |
| B1 | | | 2 symbols | |
| B2 | | | 4 symbols | |
| B3 | | | 6 symbols | |
| B4 | | | 12 symbols | |
| C0 | | | 2 symbols | |
| C2 | | | 6 symbols | |

In this case, a PRACH resource based on a device type may be configured individually in SI received before a device transmits a PRACH. That is, according to whether the IAB node is the UE or the RN, a resource for transmitting a random access preamble by the IAB node may be determined differently.

Alternatively, a PRACH resource used by a corresponding device may be configured in each SI by receiving the SI different for each device type (e.g., SI for the UE and SI for the RN are transmitted separately).

Method 2. Identification Through Msg3 Resource in Random Access Process

A resource for transmitting Msg3 may vary according to a type of a device (RN or UE) which attempts access to a gNB/RN. For example, each Msg3 transmission resource based on the device type may be configured in a random access response.

Alternatively, an RA-RATI value may be set different according to the device type, so that different random access response can be received according to the device type. That is, a random access response for the RN and a random access response for the UE may be transmitted individually, and different Msg3 transmission resources may be configured for the two. Therefore, the gNB/RN may identify a device according to the Msg3 resource to be received.

Figure 23:
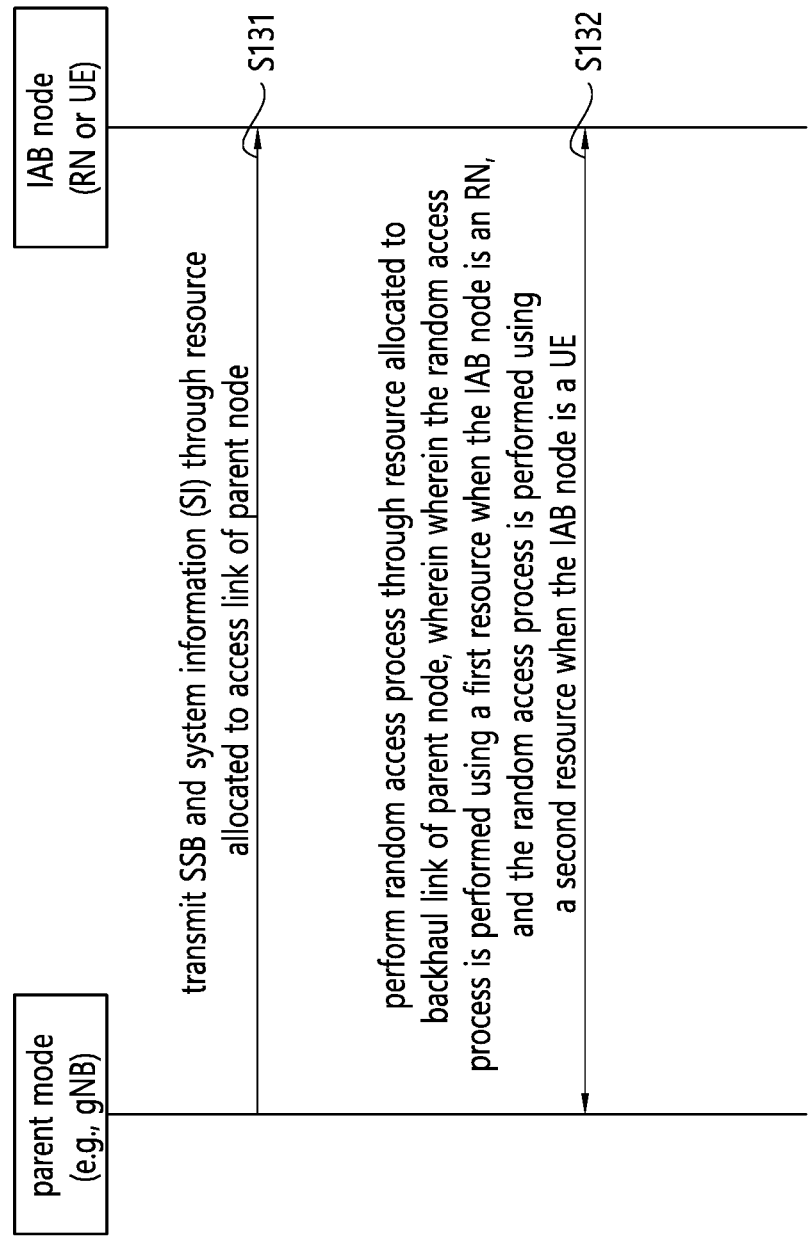
FIG. 23 exemplifies an initial access operation method of an IAB node according to the aforementioned method 1 or 2.

FIG. 23 exemplifies an initial access operation method of an IAB node according to the aforementioned method 1 or 2.

Referring to FIG. 23, a parent node transmits SSB and system information (SI) to the IAB node through a resource allocated to an access link of the parent node (S131).

The IAB node performs a random access process through a resource allocated to a backhaul link of the parent node, wherein the random access process is performed using a first resource when the IAB node is an RN, and the random access process is performed using a second resource when the IAB node is a UE (S132). Herein, the first resource and the second resource are resources identified from each other, and for example, may be resources for transmitting a random access preamble by the IAB node or resources for transmitting Msg3.

Method 3. Identification Through Scrambling of Msg3

A scrambling ID may vary when Msg3 is transmitted according to a type of a device (RN or UE) which attempts access to a gNB/RN. To this end, the gNB/RN may inform a device of the scrambling ID to be used for each device type.

Alternatively, if the device is the RN, an actual scrambling ID to be used by the RN may be obtained from a configured scrambling ID. For example, the scrambling ID to be actually used may be a value of 'the configured scrambling ID+alpha'.

Method 4. Identification Through Content of Msg3

Information for informing a type of a device (RN or UE) which attempts access to a gNB/RN may be transmitted by being included in Msg3.

For example, an indication field indicating a device type exists in the Msg3, so that the DgNB/RN is able to know the device type according to a value of the field.

B-2. When initial access is performed via backhaul link SSB of parent node

An IAB RN may perform initial access by receiving an SS/PBCH block (SSB) transmitted by a parent node via a backhaul link. In this case, specifically, the initial access may be performed as follows.

(a) SSB Reception (via Backhaul Link)

An IAB RN may receive SSB transmitted by a parent node via a backhaul link to set a DL timing (Rx timing) of a backhaul link between the parent node and the RN. Receiving the SSB includes receiving only a synchronization signal.

In this case, a DgNB and the IAB RN transmit SSB via an access link (this is called SSB_AC) to support a UE, and also transmit SSB via a backhaul link (this is called SSB_BH) to support the IAB node.

To support a legacy UE, SSB_AC may be transmitted in the same format as the legacy SSB. SSB_BH may have the same transmission format as the SSB_AC or may have a different format. Since the SSB_BH is a signal/channel transmitted to support only the RN via a backhaul link, the SSB_BH may be designed to be distinguished from the SSB_AC or may have a format that cannot be received by the UE.

MIB information transmitted via SSB_BH (such information is called MIB_BH) may be different from MIB information transmitted via SSB_AC.

(b) System Information Receive via Backhaul Link

An RN may receive system information (SI) from a parent node via a backhaul link at a later time. A PDCCH monitoring resource/PDSCH resource for obtaining the system information may be pre-defined and/or may be configured via MIB_BH. In addition, it may also be configured in the previously transmitted SI (e.g., a resource for transmitting SIB2 and/or a resource for monitoring a PDCCH to receive SIB2 may be configured in SIB1).

Regarding a configuration related to the backhaul link with the parent node and performed via the backhaul link ever since the system information reception process, 1) the RN may use a default configuration, and/or 2) the configuration may be provided via MIB_BH. Such a configuration may be transmitted at a later time during the RACH procedure (e.g., via Msg4) or may be additionally transmitted via SI/RRC or may be reconfigured. The configuration related to the backhaul link with the parent node will be described in greater detail in the section C-1 below.

In addition, regarding a configuration related to PDCCH reception in the backhaul link with the patent node, 1) the RN may use a default configuration, and/or 2) the configuration may be provided via MIB_BH. Such a configuration may be transmitted at a later time during the RACH procedure (e.g., via Msg4) or may be additionally transmitted via SI/RRC or may be reconfigured. The configuration related to PDCCH reception in the backhaul link with the parent node will be described in greater detail in the section C-2 below.

If the RN receives such a configuration from the parent node, a DL (Rx) timing in the backhaul link with the parent node can be known.

The RN may receive the system information from the parent node via the backhaul link by using the aforementioned configurations. In this case, the RN receives a PRACH resource configuration via SI, and the PRACH resource exists in the backhaul link.

(c) RACH Procedure via Backhaul Link

An RN may use a configured PRACH resource to perform an RACH procedure via a backhaul link with a parent node. Through this process, a UL timing (Tx timing) may be set for a backhaul link with the parent node.

(d) Data Communication via Backhaul Link

An RN which has obtained a UL (Tx) timing in the backhaul link through the RACH procedure and also has obtained a configuration for data transmission/reception via the backhaul link performs data transmission/reception via the backhaul link with the parent node.

(e) Slot Format Setup

An RN which has completed a backhaul link setup with a parent node necessarily prepares to support an RN with another UE. To this end, the RN may determine a configuration related to an access link in which the RN supports the UE and a backhaul link in which the RN supports different nodes. Among these configurations, a configuration for the backhaul link is described in detail in the section C-2 below, and the configuration for the access link is described in detail in section C-3 below.

When this method is used, the RN may not know a DL (Rx)/UL (Tx) timing in the access link with the parent node since the RACH procedure is performed via the backhaul link. Accordingly, if an operation for obtaining the timing in the access link with the parent node is not additionally performed or configured, only data/signal reception may not be possible in the access link with the parent node.

Initial access to the DgNB may be performed.

<Section C. Configurations for IAB RN Setup>

C-1. Configurations Related to Backhaul Link

Regarding a backhaul link of a parent node and child node, configuration information reported by the parent node to the child node may be as follows. The entirety or part of the following information may be transmitted.

i) Slot Format of Backhaul Link

Information on a time (symbol) location of a DL transmission duration D, a time (symbol) location of a UL transmission duration U, and/or a time (symbol) location of a flexible duration X may be configured for a backhaul link with a parent node. In this case, the flexible duration may imply a reserved duration or a duration which is not used for backhaul link transmission.

ii) Timing Gap for Switching from UL to DL, or from DL to UL

Figure 24:
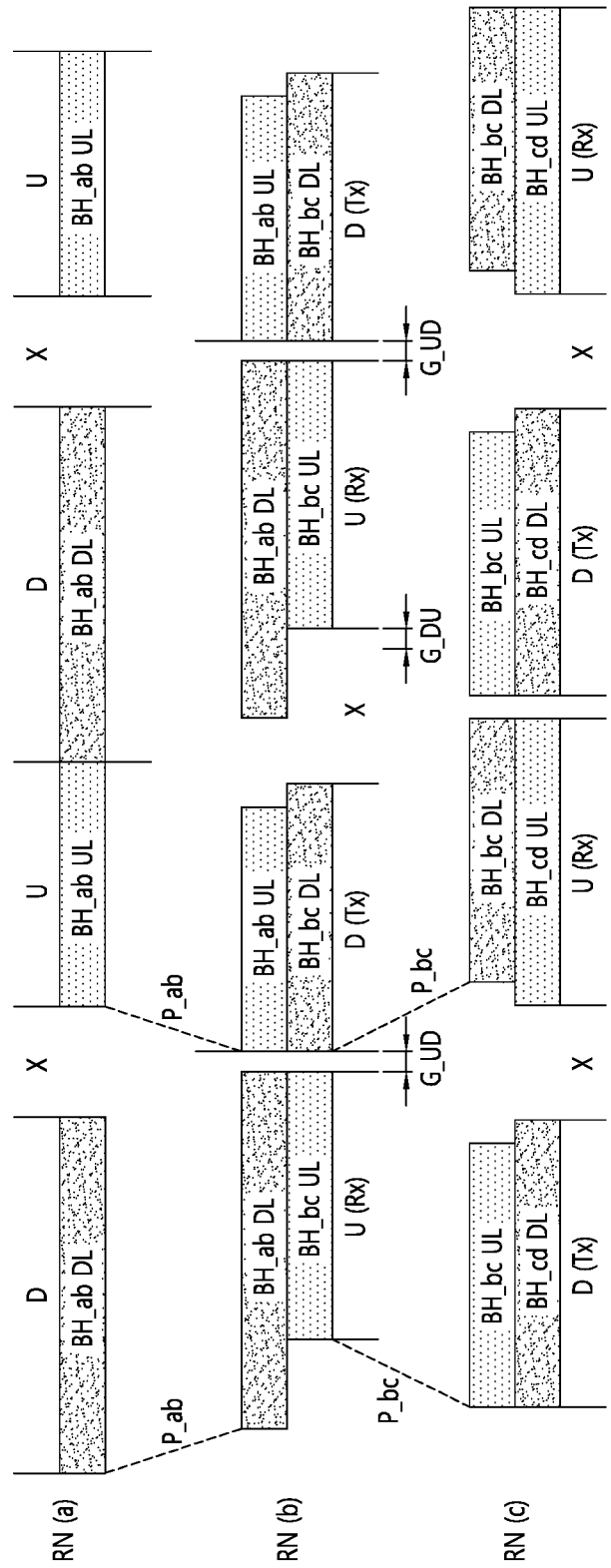
FIG. 24 exemplifies a backhaul link between a DgNB(a), an RN(b), and an RN(c), when a backhaul link with RNs is configured in an IAB environment as shown in FIG. 14.

FIG. 24 exemplifies a backhaul link between a DgNB(a), an RN(b), and an RN(c), when a backhaul link with RNs is configured in an IAB environment as shown in FIG. 14.

In FIG. 24, a backhaul link between an RN(x) and an RN(y) is denoted by BH_xy. The RN(b) receives a DL signal of BH xy transmitted by the DgNB at a timing delayed by P_ab from a Tx timing of the DgNB(a), and transmits a UL signal of BH_ab transmitted to the DgNB at a timing advanced by P_ab from an Rx timing of a DgNB(b).

Considering a half-duplex characteristic of nodes, BH_bc shall be UL when BH_ab is DL, and BH_bc shall be DL when BH_ab is UL, so that an RN(b) can perform transmission or reception simultaneously via BH_ab and BH_bc.

In addition, in order to reduce cross-link interference, signal simultaneously transmitted or received by the RN(b) via BH_ab and BH_bc preferably coincide with a symbol boundary.

Meanwhile, since a propagation delay value is not always a multiple of a symbol length, a gap is required between UL transmission and DL transmission as shown in FIG. 24. G_UL of FIG. 24 denotes a gap value required to match the symbol boundary when switching is performed from UL to DL, and G_DL denotes a gap value required to match the symbol boundary when switching is performed from DL to UL. The G_UL and the G_DL may vary for each node (RN).

Figure 25:
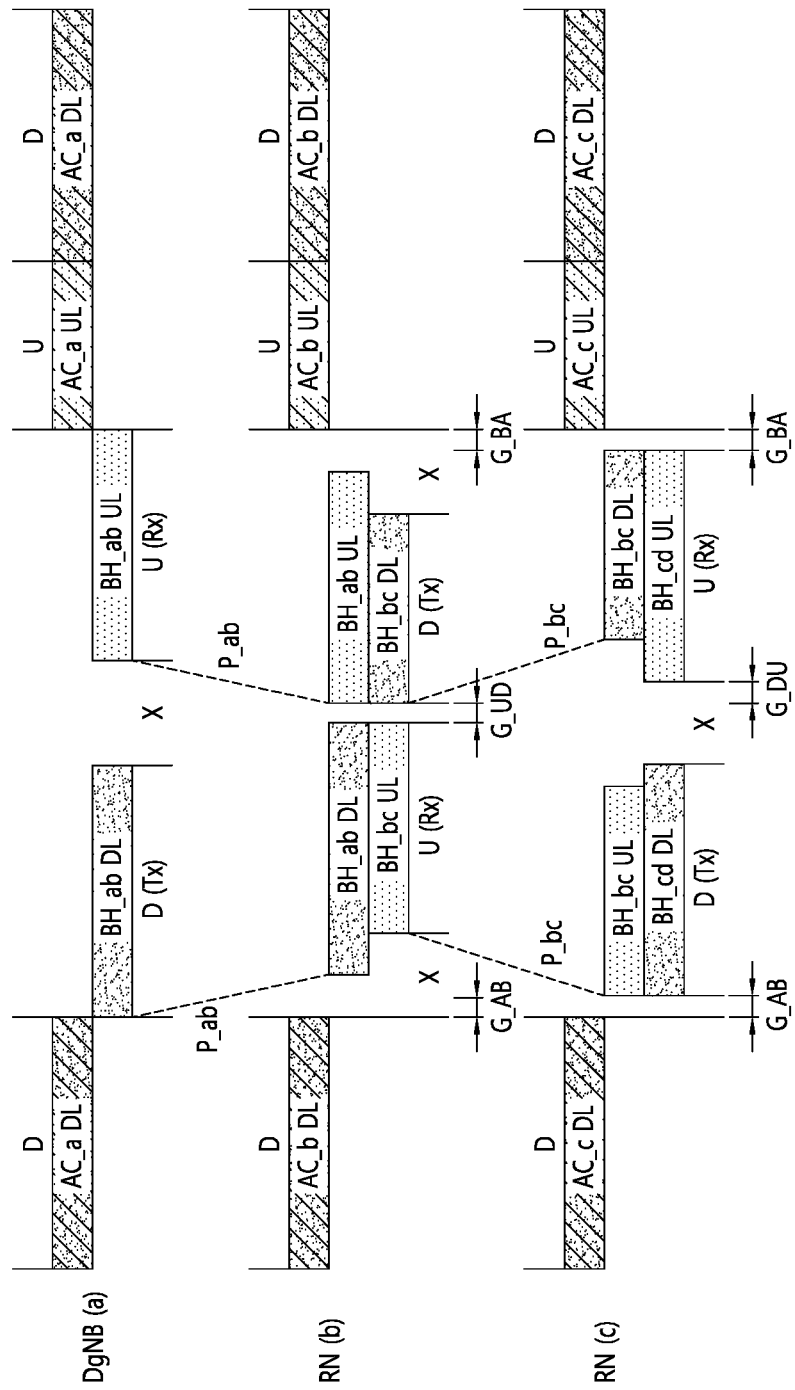
FIG. 25 exemplifies a backhaul link between a DgNB(a), an RN(b), and an RN(c), when a backhaul link with RNs is configured in an IAB environment as shown in FIG. 14.

In this case, in the RN, the G_UD and/or G_DU may be configured from the parent node to the child node. In this case, the RN may assume that only the G_UD is configured, and the G_DU is the same as 'symbol length—G_UD'. On the contrary, the RN may assume that only the G_DU is configured, and the G_UD is the same as 'symbol length—G_DU'. A gap corresponding to a minimum offset value may be required between an Rx timing and a Tx timing by considering a time required when a node switches from Rx to Tx or from Tx to Rx. Therefore, the G_UD or the G-DU shall be set to be greater than an offset value which is a time required when the node switches from Rx to Tx. If the gap value required to match a symbol boundary between UL and DL is less than the offset value, 'corresponding gap value+ symbol length' may be set as the value G UD. The same method may also be applied to the G_DU.

iii) Timing Gap for Switching from Access Link to Backhaul Link, or from Backhaul Link to Access Link FIG. 25 exemplifies a backhaul link between a DgNB(a), an RN(b), and an RN(c), when a backhaul link with RNs is configured in an IAB environment as shown in FIG. 14.

In the example of FIG. 25, the access link and the backhaul link are transmitted in a TDM manner, and a timing of the access link is identical between nodes as shown in the aforementioned section A-1.

For convenience, it is assumed that AC_x denotes an access link in which an RN(x) supports UEs. In case of the backhaul link, the RN(b) receives a DL signal of BH_xy transmitted by the DgNB at a timing delayed by P_ab from a Tx timing of the DgNB(a), and transmits a UL signal of BH_ab transmitted to the DgNB(a) at a timing advanced by P_ab from an Rx timing of a DgNB(b). In addition, there is a need to match a symbol boundary between signals simultaneously transmitted or received by the NR. In this case, a gap is required between UL transmission and DL transmission of a backhaul link signal. That is, G_UD and G_DU are required.

In addition, a gap may be required between access link transmission and backhaul link transmission as shown in FIG. 25 since a symbol boundary of the access link does not coincide with a symbol boundary of the backhaul link. G_AB of FIG. 25 denotes a gap value required to match the symbol boundary when switching is performed from the access link to the backhaul link, and G_BA denotes a value of a gap required to match the symbol boundary when switching is performed from the backhaul link to the access link. The G_AB and the G_BA may vary for each node (RN).

In this case, in the RN, the G_AB and/or the G_BA may be configured from a parent node to a child node. In this case, in particular, the G_AB may always be identical to the G_BA. In this case, only one gap value required for switching between the access link and the backhaul link may be configured.

C-2. Configurations related to PDCCH reception in backhaul link with parent node In order to receive a PDCCH via a backhaul link with a parent node, the parent node may report the following configuration information to a child node. The entirety or part of the following information may be transmitted.

i) CORESET configuration, ii) PDCCH search space configuration

C-3. Configurations related to access link

Regarding an access link between an IAB node and a UE, configuration information reported by the IAB node to the UE may be as follows. The entirety or part of the following information may be transmitted.

i) Slot Format of Access Link

Information of a time (symbol) location of a DL Tx duration D, a time (symbol) location of a UL Tx duration U, and/or a time (symbol) location of a flexible duration X may be configured for an access link with a parent node. In this case, the flexible duration may imply a reserved duration or a duration not used for access link transmission.

ii) Timing Gap for Switching from UL to DL or from DL to UL

When a backhaul link with RNs is configured in the IAB environment of FIG. 14, a backhaul link timing between a DgNB(a), an RN(b), and an RN(c) may be as shown in FIG. 24. In this case, a backhaul link timing of each RN may be identical to an access link timing thereof. Transmission of the access link and the backhaul link may not be subjected to TDM. It may be configured such that a backhaul link Tx timing is identical to an access link Tx timing, and a backhaul link Rx timing is identical to an access link Rx timing. In this case, similarly to the backhaul link, the access link also requires a gap between UL transmission and DL transmission. G_UL denotes a gap value required to match the symbol boundary when switching is performed from UL to DL, and G_DL denotes a gap value required to match the symbol boundary when switching is performed from DL to UL. The G_UL and the G_DL may vary for each node (RN).

In this case, in the UE, the G_UD and/or the G_DU may be configured from the parent node. In this case, in particular, the UE may assume that only the G_UD is configured, and the G_DU is the same as 'symbol length—G_UD'. On the contrary, the UE may assume that only the G_DU is configured, and the G_UD is the same as 'symbol length—G_DU'.

A gap corresponding to a minimum offset value is required between an Rx timing and a Tx timing by considering a time required when a node switches from Rx to Tx or from Tx to Rx. Therefore, the G_UD or the G-DU shall be set to be greater than an offset value which is a time required when the node switches from Rx to Tx. If the gap value required to match a symbol boundary between UL and DL is less than the offset value, 'corresponding gap value+ symbol length' may be set as the value G_UD. The same method may also be applied to the G_DU.

<Section D. Transmission/reception via access link after initial access>

If an IAB RN performs data transmission/reception via a backhaul link with a parent node by performing initial access, data transmission/reception is not performed afterward via an access link with the parent node. However, in the following case, data/signal transmission/reception may be achieved via the access link with the parent node.

D-1. SSB

After the initial access, the RN may receive SSB transmitted from a parent node thereof via the access link for the purpose of measurement, synchronization, or the like. Upon receiving SSB transmitted via the backhaul link of the parent node in the initial access (see the section B-2 above), only SSB of the backhaul link may be received even afterward without having to receive SSB of the access link.

D-2. System Information

If the system information is changed, the RN may need to receive the system information from the parent node even after the initial access process. In this case, the RN may receive the system information as follows.

1) After initial access, the system information may be transmitted via the backhaul link. In this case, even if the system information is received in the access link in the initial access process, the system information is received afterward via the backhaul link. The RN may monitor a cell-specific PDCCH via the backhaul link after the initial access process.

2) After initial access, the system information may be transmitted via the access link. In particular, this method may be applied when the system information is received via the access link in the initial access process.

2-1) To this end, even after the initial access process, the cell-specific PDCCH may be periodically monitored via the access link with the parent node.

2-2) To this end, scheduling information for SI(PDSCH) transmitted via the access link may be transmitted via a PDCCH transmitted via the backhaul link. In this case, although the RN monitors the cell-specific PDCCH via the backhaul link with the parent node, data actually scheduled by the PDCCH may be transmitted via the access link.

3) If the RN receives the system information via the access link in the initial access process, the system information may be received even afterward via the access link. If the RN receives the system information via the backhaul link, the system information may be received even afterward via the backhaul link.

3-1) To this end, if the RN receives the system information via the access link in the initial access process, a cell-specific PDCCH may be periodically monitored even afterward via the access link with the parent node. If the RN receives the system information via the backhaul link in the initial access process, the cell-specific PDCCH may be periodically monitored even afterward via the backhaul link with the parent node.

3-2) To this end, scheduling information for SI(PDSCH) may be transmitted via a PDCCH transmitted via the backhaul link. In this case, although the RN monitors the cell-specific PDCCH via the backhaul link with the parent node, SI actually scheduled by the PDCCH may be transmitted via a link, i.e., either the access link or the backhaul link, in which the RN receives the SI.

4) After initial access, the system information may be transmitted via the access link or the backhaul link. In this case, scheduling information for SI(PDSCH) may be transmitted via a PDCCH transmitted via the backhaul link. Although the RN monitors the cell-specific PDCCH via the backhaul link with the parent node, SI actually scheduled by the PDCCH may be transmitted via one of the access link and the backhaul link, and information regarding a specific link to be used in transmission may be included in a PDCCH (DCI).

The above content may be applied to receiving of cell-specific and/or group-specific data and monitoring of a cell-specific and/or group-specific PDCCH, in addition to the system information.

D-3. PRACH

An RN may transmit a PRACH to a parent node at the request of a parent node even after an initial access process. In this case, the PRACH may be transmitted as follows.

1) After initial access, PRACH transmission may be performed via a backhaul link. In this case, even if PRACH transmission is received in an access link in the initial access process, the PRACH is transmitted afterward via the backhaul link.

2) After the initial access, PRACH transmission may be performed via the access link. In particular, this method may be applied when PRACH transmission is performed via the access link in the initial access process.

2-1) To this end, even after the initial access process, the PDCCH may be monitored periodically to receive the PDCCH containing PRACH request information via the access link with a parent node.

2-2) To this end, scheduling information for the PRACH transmitted via the access link may be transmitted via a PDCCH transmitted via the backhaul link. In this case, although the RN monitors the PDCCH via the backhaul link with a parent node, the PRACH actually requested by the PDCCH may be transmitted via the access link.

3) When the RN transmits the PRACH via the access link in the initial access process, the PRACH may be transmitted even afterward via the access link, and when the RN transmits the PRACH via the backhaul link, the PRACH may be transmitted even afterward via the backhaul link.

3-1) To this end, when the RN transmits the PRACH via the access link in the initial access process, in order to periodically receive the PDCCH containing PRACH request information even afterward, the PDCCH may be monitored via an access link with a parent node. When the RN receives system information via the backhaul link in the initial access process, in order to periodically receive the PDCCH containing the PRACH request information even afterward, the PDCCH may be monitored via the backhaul link with the parent node.

3-2) To this end, the PRACH request information may be transmitted through the PDCCH transmitted via the backhaul link. In this case, although the RN monitors the PDCCH to receive the PDCCH containing the PRACH request information via the backhaul link with the parent node, the PRACH actually scheduled by the PDCCH may be transmitted via a link, i.e., either the access link or the backhaul link, in which the RN transmits the PRACH.

4) After the initial access, the PRACH may be transmitted via the access link or the backhaul link. In this case, the PRACH request information may be transmitted through the PDCCH to be transmitted via the backhaul link. The RN monitors the PDCCH via the backhaul link with the parent node to receive the PDCCH containing the PRACH request information. However, the PRACH actually requested by the PDCCH may be transmitted via one of the access link and the backhaul link, and information regarding which link is used in transmission may be included in a PDCCH (DCI).

D-4. Paging

An RN may receive a paging message in an RRC Idle state periodically from a parent node (or an IAB node or a DgNB).

1) After initial access, the paging message reception of the RN may always be performed via an access link. To this end, the paging message reception may be attempted via the access link in the RRC Idle state, and monitoring of a PDCCH for scheduling the paging message may be attempted via the access link.

2) After the initial access, PRACH transmission may be performed via a backhaul link. In particular, in the initial access process, this method may be applied when it is performed via the backhaul link ever since the SSB reception process (see the aforementioned sensor B-2). To this end, the paging message reception may be attempted via the backhaul link in the RRC Idle state, and monitoring of a PDCCH for scheduling the paging message may be attempted via the backhaul link.

3) When the RN receives SSB via the access link in the initial access process, the paging message may be received via the access link, and when the RN receives the SSB via the backhaul link, the paging message may be received via the backhaul link. This is because the paging message is easily received in a link for performing synchronization in an RRC Idle mode. In this case, the RN may perform monitoring of a PDCCH which schedules paging in a link for transmitting the paging message.

Figure 26:
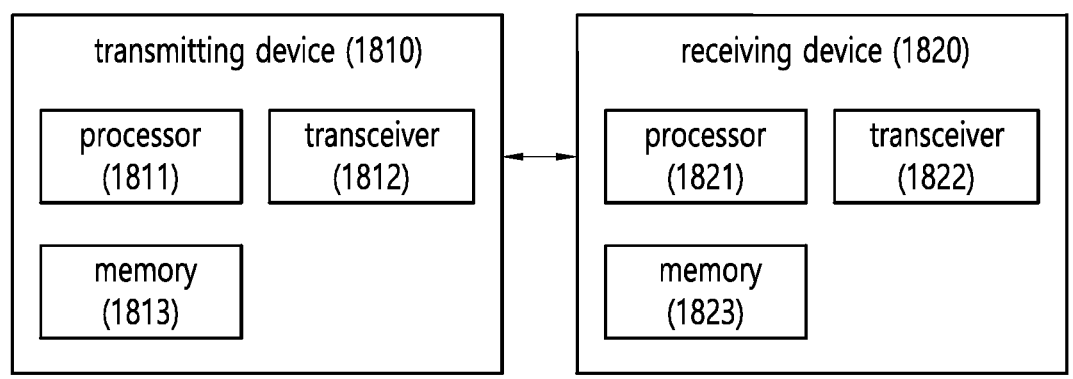
FIG. 26 is a block diagram showing a constitutional element of a transmitting device 1810 and a receiving device 1820 according to the present disclosure.

FIG. 26 is a block diagram showing a constitutional element of a transmitting device 1810 and a receiving device 1820 according to the present disclosure. Herein, the transmitting device and/or the receiving device may be a gNB, an IAB node, or a UE.

The transmitting device 1810 and the receiving device 1820 may respectively include transceivers 1812 and 1822 capable of transmitting or receiving radio frequency (RF) signals carrying information, data, signals and messages, memories 1813 and 1823 for storing various types of information regarding communication in a wireless communication system, and processors 1811 and 1821 connected to components such as the transceivers 1812 and 1822 and the memories 1813 and 1823 and configured to control the memories 1813 and 1823 and/or the transceivers 1812 and 1822 such that the corresponding devices perform at least one of embodiments of the present disclosure.

The memories 1813 and 1823 can store programs for processing and control of the processors 1811 and 1821 and temporarily store input/output information. The memories 1813 and 1823 may be used as buffers.

The processors 1811 and 1821 generally control overall operations of various modules in the transmitting device and the receiving device. Particularly, the processors 1811 and 1821 can execute various control functions for implementing the present disclosure. The processors 1811 and 1821 may be referred to as controllers, microcontrollers, microprocessors, microcomputers, etc. The processors 1811 and 1821 can be realized by hardware, firmware, software or a combination thereof. When the present disclosure is realized using hardware, the processors 1811 and 1821 may include ASICs (application specific integrated circuits), DSPs (digital signal processors), DSPDs (digital signal processing devices), PLDs (programmable logic devices), FPGAs (field programmable gate arrays) or the like configured to implement the present disclosure. When the present disclosure is realized using firmware or software, the firmware or software may be configured to include modules, procedures or functions for performing functions or operations of the present disclosure, and the firmware or software configured to implement the present disclosure may be included in the processors 1811 and 1821 or stored in the memories 1813 and 1823 and executed by the processors 1811 and 1821.

The processor 1811 of the transmitting device 1810 can perform predetermined coding and modulation on a signal and/or data to be transmitted to the outside and then transmit the signal and/or data to the transceiver 1812. For example, the processor 1811 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 1812 may include an oscillator for frequency up-conversion. The transceiver 1812 may include one or multiple transmission antennas.

The signal processing procedure of the receiving device 1820 may be reverse to the signal processing procedure of the transmitting device 1810. The transceiver 1822 of the receiving device 1820 can receive RF signals transmitted from the transmitting device 1810 under the control of the processor 1821. The transceiver 1822 may include one or multiple reception antennas. The transceiver 1822 can frequency-down-convert signals received through the reception antennas to restore baseband signals. The transceiver 1822 may include an oscillator for frequency down conversion. The processor 1821 can perform decoding and demodulation on RF signals received through the reception antennas to restore data that is intended to be transmitted by the transmitting device 1810.

The transceivers 1812 and 1822 may include one or multiple antennas. The antennas can transmit signals processed by the transceivers 1812 and 1822 to the outside or receive RF signals from the outside and deliver the RF signal to the transceivers 1812 and 1822 under the control of the processors 1811 and 1821 according to an embodiment of the present disclosure. The antennas may be referred to as antenna ports. Each antenna may correspond to one physical antenna or may be configured by a combination of a plurality of physical antenna elements. A signal transmitted from each antenna cannot be decomposed by the receiving device 1820. A reference signal (RS) transmitted corresponding to an antenna defines an antenna from the viewpoint of the receiving device 1820 and can allow the receiving device 1820 to be able to estimate a channel with respect to the antenna irrespective of whether the channel is a single radio channel from a physical antenna or a composite channel from a plurality of physical antenna elements including the antenna. That is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

Figure 27:
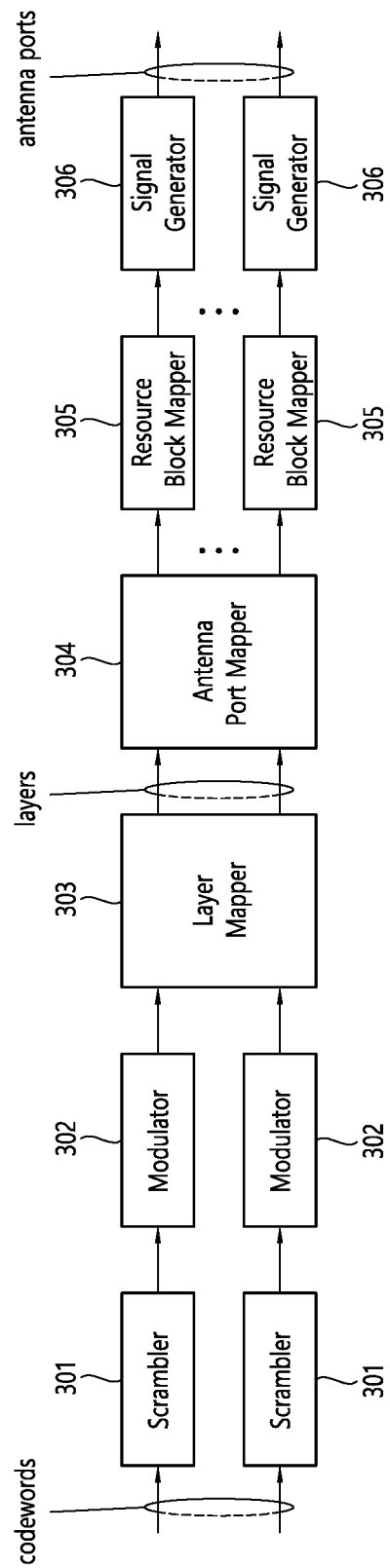
FIG. 27 illustrates an example of a signal processing module structure in the transmitting device (1810).

FIG. 27 illustrates an example of a signal processing module structure in the transmitting device 1810. Here, signal processing can be performed by a processor of a base station/terminal, such as the processors 1811 and 1821 of FIG. 26.

Referring to FIG. 27, the transmitting device 1810 included in a terminal or a base station may include scramblers 301, modulators 302, a layer mapper 303, an antenna port mapper 304, resource block mappers 305 and signal generators 306.

The transmitting device 1810 can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 28:
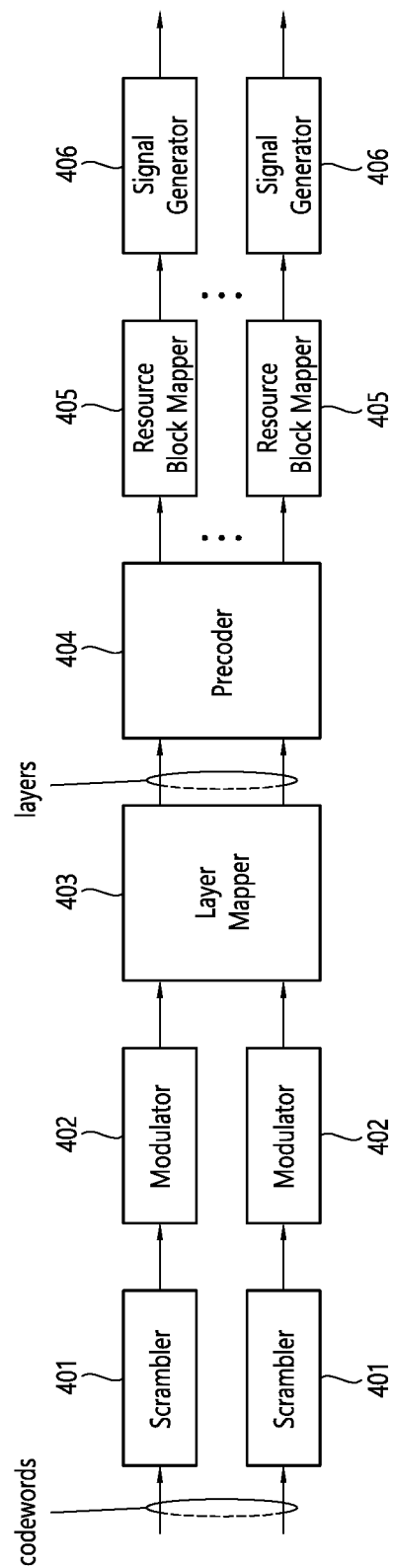
FIG. 28 illustrates another example of the signal processing module structure in the transmitting device (1810).

FIG. 28 illustrates another example of the signal processing module structure in the transmitting device 1810. Here, signal processing can be performed by a processor of a terminal/base station, such as the processors 1811 and 1821 of FIG. 26.

Referring to FIG. 28, the transmitting device 1810 included in a terminal or a base station may include scramblers 401, modulators 402, a layer mapper 403, a precoder 404, resource block mappers 405 and signal generators 406.

The transmitting device 1810 can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N*M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device 1820 may be reverse to the signal processing procedure of the transmitting device. Specifically, the processor 1821 of the transmitting device 1810 decodes and demodulates RF signals received through antenna ports of the transceiver 1822. The receiving device 1820 may include a plurality of reception antennas, and signals received through the reception antennas are restored to baseband signals, and then multiplexed and demodulated according to MIMO to be restored to a data string intended to be transmitted by the transmitting device 1810. The receiving device 1820 may include a signal restoration unit which restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit which removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 29:
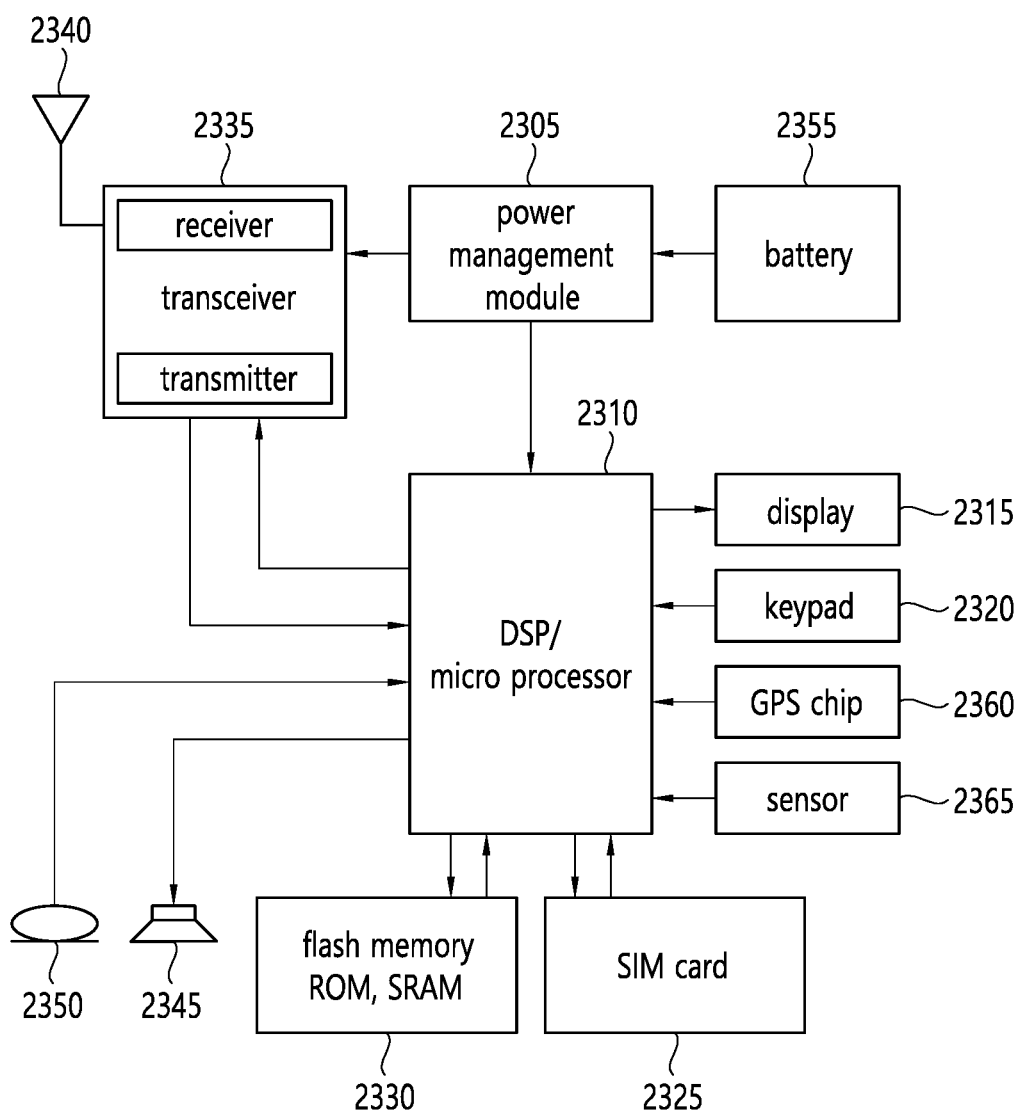
FIG. 29 illustrates an example of a wireless communication device according to an implementation example of the present disclosure.

FIG. 29 illustrates an example of a wireless communication device according to an implementation example of the present disclosure.

Referring to FIG. 29, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 29 may be the processors 1811 and 1821 in FIG. 26.

The memory 2330 is connected to the processor 2310 and stores information related to operations of the processor. The memory may be located inside or outside the processor and connected to the processor through various techniques such as wired connection and wireless connection. The memory 2330 in FIG. 29 may be the memories 1813 and 1823 in FIG. 26.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 29 may be the transceivers 1812 and 1822 in FIG. 26.

Although not shown in FIG. 29, various components such as a camera and a universal serial bus (USB) port may be additionally included in the terminal. For example, the camera may be connected to the processor 2310.

FIG. 29 is an example of implementation with respect to the terminal and implementation examples of the present disclosure are not limited thereto. The terminal need not essentially include all the components shown in FIG. 29. That is, some of the components, for example, the keypad 2320, the GPS chip 2360, the sensor 2365 and the SIM card 2325 may not be essential components. In this case, they may not be included in the terminal.

Figure 30:
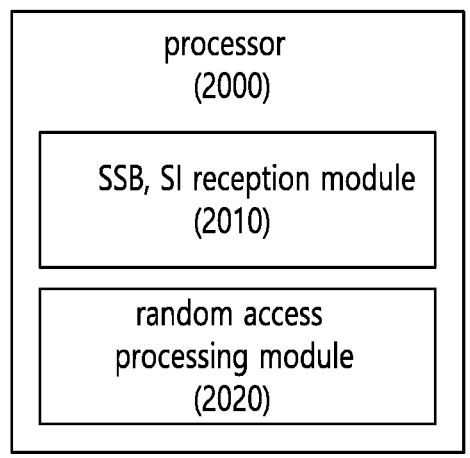
FIG. 30 exemplifies a processor in terms of an IAB node/UE.

FIG. 30 exemplifies a processor in terms of an IAB node/UE.

A processor 2000 may include an SSB, SI reception module 2010 and a random access processing module 2020. The processor 2000 may correspond to the processor of FIG. 26 to FIG. 29.

The SSB, SI reception module 2010 may receive SSB and SI from a parent node. The random access processing module 2020 performs a random access process.

Figure 31:
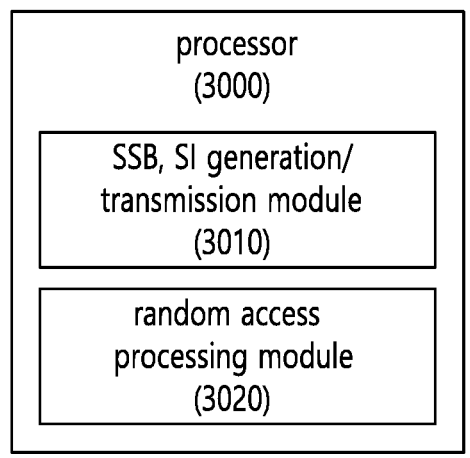
FIG. 31 exemplifies a processor in terms of a gNB/IAB node.

FIG. 31 exemplifies a processor in terms of a gNB/IAB node.

A processor 3000 may include an SSB, SI generation/transmission module 3010 and a random access processing module 3020. The processor 3000 may correspond to the processor of FIG. 26 to FIG. 29.

The SSB, SI generation/transmission module 3010 generates and transmits SSB and SI. The random access processing module 3020 performs a random access process.

A method performed by the processors of FIG. 30 and FIG. 31 has already been described with reference to FIG. 20 to FIG. 23.

Figure 32:
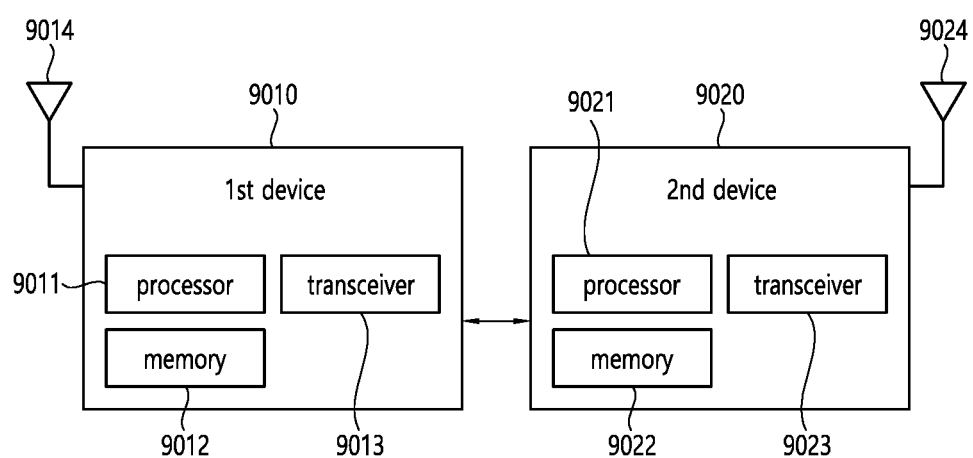
FIG. 32 shows a wireless communication system according to an embodiment.

FIG. 32 shows a wireless communication system according to an embodiment.

Referring to FIG. 32, a wireless communication system may include a first device 9010 and a second device 9020.

The first device 9010 may be a base station, a network node, a transmitting terminal, a receiving terminal, a wireless device, a wireless communication device, a vehicle, a vehicle equipped with self-driving capability, a connected car, a drone (or an unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a climate/environment device, a device related to a 5G service, or a device related to a field of the $4^{th}$ industrial revolution.

The second device 9020 may be a base station, a network node, a transmitting terminal, a receiving terminal, a wireless device, a wireless communication device, a vehicle, a vehicle equipped with self-driving capability, a connected car, a drone (or an unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a climate/environment device, a device related to a 5G service, or a device related to a field of the $4^{th}$ industrial revolution.

For example, a terminal may include a mobile phone, a smart phone, a laptop computer, a digital broadcasting terminal, a personal digital assistants (PDA), a portable multimedia player (PMP), a navigation, a slate PC, a table PC, an ultrabook, a wearable device (e.g., a smartwatch, a smart glass, a head mounted display (HMD)), or the like. For example, the HMD may be a display device worn on a head. For example, the HMD may be used to implement VR, AR, or MR.

For example, the drone may be an unmanned aerial vehicle which flies by using a radio control signal. For example, the VR device may include a device for realizing an object, background, or the like of a virtual world. For example, the AR device may include a device for realizing an object or background of a virtual world by connecting with an object or background or the like of a real world. For example, the MR device may include a device for realizing an object or background of a virtual world by merging an object, background, or the like of a real world. For example, the hologram device may include a device for recording and reproducing stereoscopic information to realize a 360-degree stereoscopic image, by utilizing light interference which occurs when two laser beams called holography are met. For example, the public safety device may include an image relay device or an image device or the like which can be worn on a user's body. For example, the MTC device and the IoT device may be devices not requiring direct human intervention or manipulation. For example, the MTC device and the IoT device may include a smart meter, a bending machine, a thermometer, a smart bulb, a door lock, or various sensors. For example, the medical device may be a device used for diagnosing, curing, alleviating, treating, or preventing a disease. For example, the medial device may be a device used for diagnosing, curing, alleviating or ameliorating an injury or disorder. For example, the medial device may be a device used for inspecting, replacing, or modifying a structure or function. For example, the medical device may be a device used for controlling pregnancy. For example, the medical device may include a diagnostic device, a surgical device, a (in vitro) diagnostic device, a hearing aid, or a treatment device. For example, the security device may be a device installed to prevent potential hazards and maintain security. For example, the security device may be a camera, a CCTV, a recorder, or a black box. For example, the Fin-Tech device may be a device capable of providing financial services such as mobile payment. For example, the Fin-tech device may include a payment device or a point of sales (POS). For example, the climate/environmental device may include a device for monitoring or predicting climates/environments.

The first device 9010 may include at least one processor such as a processor 9011, at least one memory such as a memory 9012, and at least one transceiver such as a transceiver 9013. The processor 9011 may perform the aforementioned functions, procedures, and/or methods. The processor 9011 may perform one or more protocols. For example, the processor 9011 may perform one or more layers of a radio interface protocol. The memory 9012 may be coupled to the processor 9011, and may store various types of information and/or commands. The transceiver 9013 may be coupled to the processor 9011, and may be controlled to transmit/receive a radio signal.

The second device 9020 may include at least one processor such as a processor 9021, at least one memory such as a memory 9022, and at least one transceiver such as a transceiver 9023. The processor 9021 may perform the aforementioned functions, procedures, and/or methods. The processor 9021 may perform one or more protocols. For example, the processor 9021 may perform one or more layers of a radio interface protocol. The memory 9022 may be coupled to the processor 9021, and may store various types of information and/or commands. The transceiver 9023 may be coupled to the processor 9021, and may be controlled to transmit/receive a radio signal.

The memory 9012 and/or the memory 9022 may be connected internally or externally to the processor 9011 and/or the processor 9021, respectively, or may be connected to other processors through various techniques such as wired or wireless connections.

The first device 9010 and/or the second device 9020 may have one or more antennas. For example, an antenna 9014 and/or an antenna 9024 may be configured to transmit/receive a radio signal.

Figure 33:
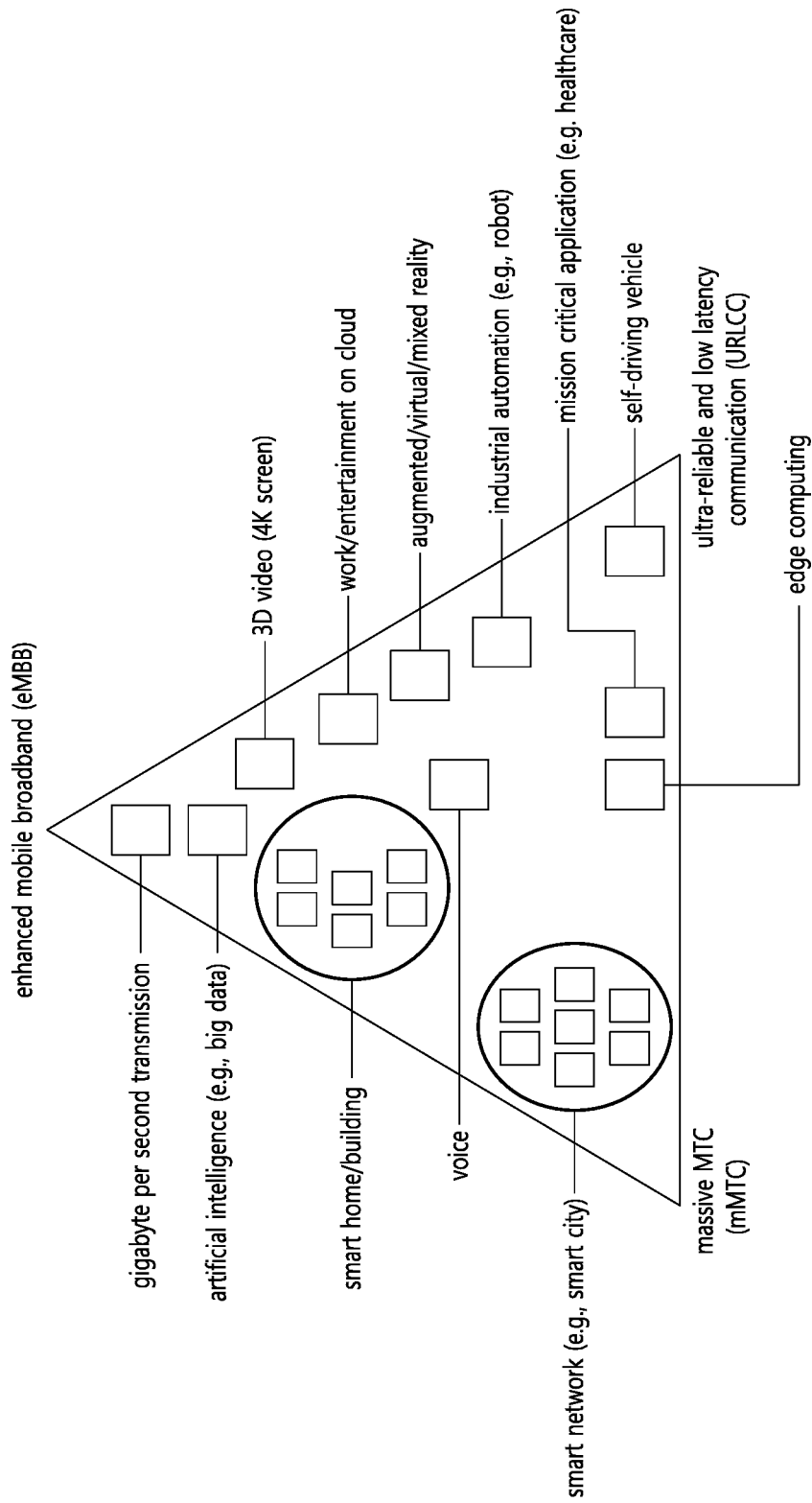
FIG. 33 shows an example of a 5G usage scenario to which the technical feature of the present disclosure is applicable.

FIG. 33 shows an example of a 5G usage scenario to which the technical feature of the present disclosure is applicable. The 5G usage scenario of FIG. 33 is for exemplary purposes only, and thus technical features of the present disclosure are also applicable to other 5G usage scenarios not shown in FIG. 33.

Referring to FIG. 33, three main requirement areas of 5G includes: (1) an enhanced mobile broadband (eMBB) area; (2) a massive machine type communication (mMTC) area; and (3) an ultra-reliable and low latency communications (URLLC) area. In some usage examples, a plurality of areas may be required for optimization. In other usage examples, only one key performance indicator (KPI) may be focused. The 5G supports these various usage examples in a flexible and reliable manner.

The eMBB focuses on overall improvement of a data rate, latency, user density, mobile broadband access capacity, and coverage. The eMBB aims at a throughput of about 10 Gbps. The eMBB allows to surpass basic mobile Internet access, and covers sufficient interactive tasks, media in a cloud or augmented reality, and entertainment application. Data is one of the core engine for 5G, and it seems that a dedicated voice service can be seen for the first time in the 5G era. In the 5G, it is expected that voice will be simply processed with an application program by using a data connection provided by a communication system. A main reason of an increased traffic amount is an increase in a content size and an increase in the number of applications requiring a high data transfer rate. A streaming service (audio and video), interactive video, and mobile Internet connectivity will be more widely used as more devices are connected to the Internet. These many applications require always-on connectivity to push real-time information and notifications to a user. There is a rapid increase in cloud storage and applications in a mobile communication platform, which is applicable to both work and entertainment. The cloud storage is a special example of driving an increase in an uplink data transfer rate. The 5G is also used for a remote task on the cloud, and requires much lower end-to-end latency to maintain excellent user experience when a tactile interface is used. Taking entertainment for example, cloud games and video streaming are another key element requiring improvement in mobile broadband capability. The entertainment is essential in a smartphone and a tablet anywhere, including a high mobility environment such as a train, a car, and an airplane. Another usage example is augmented reality and information retrieval for entertainment. Herein, the augmented reality requires very low latency and an instantaneous data amount.

The mMTC is designed to enable communication between a plenty of low-cost devices driven by batteries and is intended to support an application such as smart metering, logistics, and field and body sensors. The mMTC aims at about 10-year-lifespan batteries and/or about million devices per square kilometer (1 km$^2$). The mMTC may configure a sensor network by seamlessly connecting an embedded sensor in all sectors, and is one of the most expected 5G usage examples. Potentially, it is predicted that the number of IoT devices will reach 20.4 billion by 2020. Industrial IoT is one of areas where the 5G plays a key role in enabling smart cities, asset tracking, smart utilities, agriculture, and security infrastructures.

The URLLC allows a device and a machine to communicate with very high reliability, very low latency, and high availability, and thus is identical to communication and control between self-driving vehicles, industrial control, factory automation, mission-critical applications such as remote operations and healthcare, smart grids, and public safety applications. The URLLC aims at a latency of about 1 ms. The URLLC includes a new service which will change the industry via a link with high-reliability/ultra-low latency such as remote control and self-driving vehicles. A level of reliability and latency is essential for smart grid control, industrial automation, robotics, and drone control and adjustment.

Next, a plurality of usage examples included in the triangle of FIG. 33 will be described in greater detail.

In 5G, fiber-to-the-home (FTTH) and cable-based broadband (or DOCSIS) may be compensated as a means of providing a stream rated in the range from hundreds of megabits per second to gigabits per second. This fast speed may be required not only in virtual reality (VR) and augmented reality (AR) but also in transferring TV broadcasting in the resolution of at least 4 K (6K, 8K, or higher). VR and AR applications include almost immersive sports events. A specific application may require a special network configuration. For example, in case of the VR game, a game company may have to integrate a core server with an edge network server of an operator in order to minimize latency.

Automotive is expected to become an important new engine for 5G, together with many usages for mobile communications for vehicles. For example, entertainment for a passenger demands high capacity and high mobile broadband at the same time. This is because future users will continue to expect high-quality connectivity regardless of their locations and speeds. Another usage example of the automotive sector is an augmented reality dashboard. Through the augmented reality dashboard, a driver is able to identify an object, in the dark, shown above that the driver is seeing through a windshield. The augmented reality dashboard displays information to be reported to the deriver as to a distance and movement of an object in an overlapping manner. In the future, a radio module will enable communication between vehicles, information exchange between a vehicle and a supported infrastructure, and information exchange between an automotive and another connected device (e.g., a device carried by a pedestrian). The safety system guides an alternative course of action so that the driver can drive more safely, thereby decreasing a risk of accidents. A next step will be a remote control vehicle or a self-driving vehicle. This requires very reliable and very fast communication between different self-driving vehicles and/or between an automotive and an infrastructure. In the future, the self-driving vehicle will perform all driving activities, and the driver will focus only on erroneous traffic which cannot be identified by the vehicle itself. A technical requirement of the self-driving vehicle is ultra-low latency and ultra-high reliability so that traffic safety is increased to a level that cannot be achieved by humans.

A smart city and a smart home, referred to as a smart society, will be embedded in a high-density wireless sensor network as an example of a smart network. A distributed network of an intelligent sensor will identify a condition for cost and energy-efficient maintenance of a city or home. A similar configuration may be performed for each household. A temperature sensor, a window and heating controller, a burglar alarm, and home appliance are all wirelessly connected. Many of these sensors typically require a low data rate, low power, and low cost. For example, however, real-time HD video may be required in a specific-type device for surveillance.

Since consumption and distribution of energy, including heat or gas, are highly dispersed, automated control of a distributed sensor network is required. The smart grid interconnects these sensors by using digital information and communication techniques to collect information and act according to the information. This information may include acts of suppliers and consumers, allowing the smart grid to improve distribution of fuels such as electricity in an efficient, reliable, production sustainable, and automated manner. The smart grid may be regarded as another sensor network with low latency.

The health sector has many applications which can benefit from mobile communication. A communication system may support telemedicine which provides a clinical care in remote locations. This may help to reduce a barrier for a distance, and may improve access to a medical service which cannot be persistently used in a far rural area. This is also used to save lives in a critical care and an emergency situation. A wireless sensor network based on mobile communication may provide remote monitoring and sensors for parameters such as heart rates and blood pressure.

Wireless and mobile communications are becoming gradually important in an industrial application sector. Wiring is expensive in terms of installation and maintenance cost. Therefore, a possibility of replacing a cable with a radio link that can be reconfigured is an attractive opportunity in many industrial sectors. However, to achieve this, wireless connectivity is required to operate with latency, reliability, and capacity similar to those of a cable, and to be managed in a simplified manner. Low latency and very low error probability are new requirements, which requires 5G connectivity.

Logistics and cargo tracking are an important usage example for mobile communication which enables inventory and package tracking anywhere by using a location-based information system. An example of using logistics and cargo tracking typically requires a low data rate, but requires wide range and reliable location information.

What is claimed is:

1. A method of performing a random access procedure of an Integrated Access and Backhaul (IAB) node in a wireless communication system, the method comprising:
receiving information related to random access channel (RACH) parameters; and
performing a random access procedure to a parent node based on the information,
wherein the information comprises a configuration for informing a RACH parameter depending on a device type of the IAB node, and
wherein a first parameter for the IAB node is derived by adding or multiplying an offset, provided by the information, to a second parameter for a terminal.

2. The method of claim 1, wherein the configuration is received through a radio resource control (RRC) message.

3. The method of claim 1, wherein the configuration informs RACH resources that are classified based on whether the IAB node is a relay node or the terminal.

4. The method of claim 1, wherein the information is included in system information.

5. The method of claim 1, wherein the random access procedure is related to an initial access to the parent node.

6. The method of claim 1, wherein the information comprises i) a first configuration informing available RACH resources based on the IAB node being a relay node and ii) a second configuration informing available RACH resources based on the IAB node being the terminal.

7. An Integrated Access and Backhaul (IAB) node, comprising:
a transceiver transmitting and receiving radio signals; and
a processor being operatively connected to the transceiver,
wherein the processor is configured to:
receive information related to random access channel (RACH) parameters, and
perform a random access procedure to a parent node based on the information,
wherein the information comprises a configuration for informing a RACH parameter depending on a device type of the IAB node, and
wherein a first parameter for the IAB node is derived by adding or multiplying an offset, provided by the information, to a second parameter for a terminal.

8. The IAB node of claim 7, wherein the configuration is received through a radio resource control (RRC) message.

9. The IAB node of claim 7, wherein the configuration informs RACH resources that are classified based on whether the IAB node is a relay node or the terminal.

10. The IAB node of claim 7, wherein the information is included in system information.

11. The IAB node of claim 7, wherein the random access procedure is related to an initial access to the parent node.

12. The IAB node of claim 7, wherein the information comprises i) a first configuration informing available RACH resources based on the IAB node being a relay node and ii) a second configuration informing available RACH resources based on the IAB node being the terminal.

13. An apparatus, the apparatus comprising:
a memory; and
a processor being operatively connected to the memory,
wherein the processor is configured to control a wireless communication device to:
receive information related to random access channel (RACH) parameters, and
perform a random access procedure to a parent node based on the information,
wherein the information comprises a configuration for informing a RACH parameter depending on a device type of the IAB node, and
wherein a first parameter for the IAB node is derived by adding or multiplying an offset, provided by the information, to a second parameter for a terminal.

* * * * *